US012771548B2

(12) United States Patent
Grigorov et al.

(10) Patent No.: US 12,771,548 B2
(45) Date of Patent: Oct. 20, 2026

(54) METHOD FOR RULE-DRIVEN AUTHENTICATION WITH DECOUPLED IDENTIFICATION CHOICE

(71) Applicant: ICT PLATFORMS LTD, Sofia (BG)

(72) Inventors: Dimitar Anastasov Grigorov, Sofia (BG); Svetoslav Marinov Novkov, Sofia (BG)

( * ) Notice: Subject to any disclaimer, the term of this patent is extended or adjusted under 35 U.S.C. 154(b) by 0 days.

(21) Appl. No.: 18/854,764

(22) PCT Filed: May 30, 2022

(86) PCT No.: PCT/BG2022/000006

§ 371 (c)(1),
(2) Date: Oct. 7, 2024

(87) PCT Pub. No.: WO2023/193068

PCT Pub. Date: Oct. 12, 2023

(65) Prior Publication Data

US 2025/0247238 A1 Jul. 31, 2025

(30) Foreign Application Priority Data

Apr. 7, 2022 (BG) ........................................ 113519

(51) Int. Cl.
*H04L 9/32* (2006.01)

(52) U.S. Cl.
CPC .................................. *H04L 9/3226* (2013.01)

(58) Field of Classification Search
CPC ..................................................... H04L 9/3226
USPC .......................................................... 713/184
See application file for complete search history.

(56) References Cited

U.S. PATENT DOCUMENTS

| | | | | |
|---|---|---|---|---|
| 8,478,990 | B2 * | 7/2013 | Brown | H04L 9/3226 713/186 |
| 9,959,694 | B2 * | 5/2018 | Lindsay | G06F 21/31 |
| 12,395,485 | B2 * | 8/2025 | Finnan | H04W 12/06 |
| 2019/0124068 | A1 * | 4/2019 | Anders | H04L 63/083 |
| 2019/0165944 | A1 * | 5/2019 | Sun | H04L 9/3271 |
| 2019/0236258 | A1 * | 8/2019 | Mooney | G06F 21/36 |
| 2023/0057862 | A1 * | 2/2023 | Finnan | H04L 63/0838 |

* cited by examiner

*Primary Examiner* — Dant B Shaifer Harriman
(74) *Attorney, Agent, or Firm* — PatShegen IP; Moshe Pinchas

(57) ABSTRACT

The invention relates to a method for authentication, designed to allow access and may find application for the purpose of ensuring a higher level of security in electronic identification and communication and protection against unauthorized access, including visual, video or another surveillance of the process. The method is applicable and works successfully in various physical, virtual and operational environments, the protection being achieved by combining secret elements with decoys and implicit rules, that can be further changed by hidden instructions. The method significantly limits the possibilities of using standard methods for tracking user actions by recording key strokes and cursor movements (keyloggers), or taking screenshots (screen recorders), or surveillance, as visible actions do not reveal the secret combination. Also, the method does not require the use of additional security devices/keys of any kind.

20 Claims, 27 Drawing Sheets

Fig. 7A
Mark The Correct Fields
MARK THE ELEMENT (the Blue Colour)
Your Secret Combination
Mark the Element
Mark The Correct Fields
Your Secret Combination
Mark the Element

Fig. 7B
Mark The Correct Fields
Your Element (Orange)
MARK THE FIELD ON THE RIGHT
Login
Your Secret Combination
Mark on the Right
Mark The Correct Fields
Login
Your Secret Combination
Mark on the Right

Fig. 7D
Mark The Correct Fields
FOLLOW THE ARROW (Bellow the Element)
Mark This Field
Login
Your Secret Combination
Mark The Correct Fields
Login
Your Secret Combination

Fig. 7E
Mark The Correct Fields
FAKE CLICK
Click wherever you want
(1 click in this example)
Login
Your Secret Combination
Mark The Correct Fields
Login
Your Secret Combination
1
1
Fake

Fig. 12
Mark The Correct Fields
Don't Mark the Field in Accordance with the Usual Rule (not the Field with the Blue Background (this time)!
Mark The Correct Fields
Mark the Field in Accordance with the Active Instruction (the Field with Number 6 as the Blue Colour Instruction Requires)!

Fig. 16
Logic Model/Associative Model
2
3
4
5
7
8
9
0
Secret Combination
Options
OR
NOT
AND
XOR
Fake Clicks
Count
Look for
AND
4
4
Fake
Associative Model
When the Clover and 4 are in the same Field, make 4 fake clicks
Login

Fig. 17
Logic Model / Custom Model
2
3
4
5
6
8
9
0
Secret Combination
Options
OR
NOT
AND
XOR
X
Fake Clicks
Custom Logic Model of Element
AND
AND
OR
4
Fake
AND
ELSE
OK
Custom Model
in this case, Follow the Element
Login
Custom Model
in this case, Make 4 Fake Clicks
Login
Custom Model
in this case, Mark the Element
Login

METHOD FOR RULE-DRIVEN AUTHENTICATION WITH DECOUPLED IDENTIFICATION CHOICE

FIELD OF THE INVENTION

The invention relates to a method for authentication, designed to allow access and may find application for the purpose of ensuring a higher level of security in electronic identification and/or communication and protection against unauthorized access, including visual, video or another surveillance of the process.

BACKGROUND OF THE INVENTION

Various methods for electronic authentication are currently known. Authentication is typically performed through interaction between user and computer system. The computer system may ascertain the user's identity by requesting one or more authentication factors from the user.

The most common authentication factors are identifier, e.g. username and "knowledge-based authentication factor", e.g password and/or personal identification number (PIN). The user is typically authenticated if the combination of authentication factors provided by the user matches records pertaining to the user's identity [U.S. Pat. No. 8,392,975]. Because the process authorizes login, it is often called "login". After the user enters a username and password, the computer compares them with those stored in the database and, if they match, grants the user access to the system. "What user knows"—based authentication systems are the most attractive due to being cheap, user friendly, easily electronically deployable, and requiring no additional hardware, as opposed to other authentication factors [US20040119746].

Their main weakness is that the password can be stolen, accidentally revealed or forgotten. Theft can be done with the help of spyware, which records keyboard strokes and/or cursor movements (so-called Key Listener and Key Logger), in some cases with the help of software that captures the readings on the screen (so-called Screen Recorder), with Log-In Session Videotaping or another way for eavesdropping.

Widely available micro audio and visual sensors, and other tools, facilitate hidden observations. Video-and/or audio-recording is possible from a significant distance and any time of the day, jeopardizing secret passwords or PINs entered by computer or network online users at public locations (ATM machines; customers at Point-Of-Sales; Internet terminals offered at various conferences, cafes, libraries; employees sharing large offices with desktop computer terminals within everybody's visual reach, and other places) [US20040123151].

Password detection can be done even by brute-force attack, known as a Dictionary attack, of successively trying words in an exhaustive list. Dictionary attacks, applied either to hashed passwords, intercepted on communication lines, or directly at the password entry devices, allow for quite easy password re-engineering [US20040123151].

Typical users select passwords within a "comfort level" of complexity for memorization, usually in the range from 1 to 7 (or 8) alphanumeric characters long. Often, the password is a simple word or an integer number (like "London" and 123456). Therefore, detection is not particularly difficult. Security breaches are possible even with lower technological means for "Shoulder Surfing", when an intruder nearby the legitimate user watches password entering. In addition, a password with a higher degree of security is relatively slow to enter and much harder to remember. Therefore, the measures put in place to ensure strong, but often meaningless passwords, frequently result in users writing them down and keeping them near the computer in order to recall them quickly, thus making it easy for an intruder to find and use them and, in essence, defeating the purpose of the password [US20040230843].

Therefore, some of the modern authentication methods use a second authentication factor from the "possession-based" category—an additional autonomous device in user possession (e.g. smartphone), generating/receiving unique for the user, for the specific moment and the device dynamic identification code (so-called one-time password (OTP)). OTP is usually a short code (6 to 8 digits), used once, generated by a hardware token, software token uploaded to a device or by a random number generator sending the code to the user via SMS, e-mail or another communication channel.

Similar method for authentication can also be applied on a device that is not owned by the user, as well as in public places. Although it provides more security than a regular password, a one-time password has drawbacks: it is vulnerable to phishing and Man-in-the-middle (MitM) attacks, it can be reproduced after stealing the key that generates it; it can be intercepted and eavesdropped, it requires a device and a connection to it. In addition, the use of a one-time password requires a difficult and time-consuming integration process with adjustments, sometimes major ones, to the flow and logic of the information systems, it is often associated with manually copying code from one device to another.

A security key, which works with a pre-installed driver on public physical media (USB, NFC, Bluetooth), can also play a second authentication factor. In this case, there is the inconvenience for the user that he has to possess a physical device, to carry it with him and periodically renew it. In addition, there are already many security breaches in the use of such a key due to improper storage and protection. During these breaches, after intercepting the PIN code or the password for identification of the device control software, the malicious persons gain illegal access to the physical device or the computer system, when the device is actively turned on, and also while the control software is running, such as in the latter case, they may not even need to have the PIN or password for the control software.

Furthermore, the authentication methods, using "possession-based" factor are usually slow and cumbersome, often do not scale, are complicated to understand, usually difficult and time-consuming to set up, are susceptible to social-engineering attacks against both the user or the provider support staff, are expensive to deploy and use, and have no secure resistance to loss or theft.

Therefore, there are also methods, using an authentication factor from the "inherent" category—a factor that is based on a natural attribute of a natural person and the subject is required to prove that he has this physical attribute (fingerprint, iris, face, etc.).

With these methods, there is a risk of incorrect or fraudulent biometric authentication. Biometrics is great deal more expensive and difficult to deploy. There is, also, a significant public reluctance against biometric authentication methods due to religious and cultural concerns. Another strong concern, if using biometrics, is private biometrics data safety. Once stolen, the biometric data can be re-used forever to impersonate the individual that the data is taken from, as they cannot be replaced [US20040123151]. Biometrics are usually easy to steal or emulate, they are unreliable and approximate, may encourage perceived or real kidnapping and physical coercion dangers that place users in heightened stress or danger, have severe privacy-reducing drawbacks, and many states and countries restrict or ban the use or collection or exchange of biometrics from all or part of their populations and in some or all situations [US20170346851].

Existing security and authentication techniques are riddled with oversights and compromises. They suffer tradeoffs for usability (at the expense of security) or tradeoffs for security (at the expense of usability). Almost all existing security methods include compromises, like, for example, the ability to log in without knowing your password, by simply requesting a new password, or the ability to log in without using a biometric fingerprint, by instead using a PIN number or passcode [US20170346851].

Many difficulties exist that prevent the easy removal of such compromises: if the improved security does not continue to function securely in the event of loss, theft, or user forgetfulness, compromises will be needed still [US20170346851]:

If the method is too hard to understand, many users will be unable to use it.

If it is too slow to use, many users will not want to use it.

If it depends on expensive components, many users will be unable to afford to use it.

If it does not scale (e.g. can be used in hundreds of different places, like web sites, or by large numbers of different users), it will be impractical for users to use or providers to offer.

If it requires physical connection but doesn't accommodate every different kind of connector or is needed on machines without connectors, it will be unusable in numerous circumstances.

If it cannot work without an internet connection (e.g. requires a mobile device data connection, but device owner has no internet credit remaining), it will not work frequently enough to be reliable.

If it "gets it wrong" sometimes (e.g. biometrics, especially fingerprints after swimming, faces in the dark, and voices when ill), a potentially security-weakening alternative will be needed.

If users are scared of it, or philosophically oppose it, they will refuse to use it (e.g. biometrics).

If it can be lost, forgotten, or changes, and no secure mitigation for this exists, it will need a bypass.

If the implementation (without a compromise) necessitates additional support costs, it may be impossible on uneconomic to deploy.

If it's too hard for a user to set up, or too hard for a provider to deploy, or requires physical delivery, or could be subject to unreliable delivery, or is of a prohibitive cost to be economically sensible to deploy, or deployment relies on information which users are unwilling to disclose (e.g. addresses, phone numbers, birthdays, personal information, biometrics, etc.), or any other reason exists that prevents it achieving full user coverage, then it will be impossible to avoid compromising the method.

The proliferation of the internet has brought numerous new services to consumers, the outcome of which is that today, on average, each internet user has 70 different online accounts (e.g. email, social, work, banking, interests, forums, clubs, shopping, selling, auctions, payments, transport, entertainment, games, and so on). Best practice for passwords dictates that they never be used on more than one site, that they be long and unguessable, that they contain combinations of big and little letters, numbers and other symbols, and that they be changed on a regular basis, and not written down anywhere, and only used on secure sites after verifying site security certificate credentials. This is clearly ridiculous, and all that effort is ineffective anyway, with the advent of modern attack methods like phishing, malware, active MitM, and more, which happily steal or bypass whatever passwords are used. Most users defy best practice, using short or easy passwords, re-using them, recording or writing them down, and rarely, if ever, checking site security certificate credentials first [US20170346851].

Therefore, alternative methods are being developed that pursue higher security at less cost and difficulty.

There are user identification methods in which the user enters a graphic passcode (e.g. EP2493228, US20040230843, U.S. Pat. No. 8,392,975 and etc.). These methods are vulnerable to spyware, which captures the screen, as well as lower-tech attacks, such as "Shoulder Surfing" because the proposed graphic password is static (the image sequence is the same during different authentication sessions).

These shortcomings are partly overcome by a fraud resistant passcode entry system [US20160328552], including a method for user passcode creation and a method for user passcode authentication.

The method for user passcode creation consists of the following operations:

receiving a selected passcode sequence comprising: an arrangement of inputs, wherein each input comprising at least two different properties from a group comprising images, alpha-numeric characters, symbols, colors, patterns, sounds, textures, topology, location, orientation, or relative position with respect to a user interface, the passcode being received on the user interface, wherein each property is assigned a system interpretation value by which the property is identified by the system, wherein the properties are organized into property sets, each set comprising a distinct grouping of properties to be identifiable as a unit by the system, while also maintaining each property as individually identifiable, and each property set is assigned a set identifier to be used in referencing and identifying the property set, wherein the set identifier of each property is stored as a property pattern with the passcode sequence to be later utilized along with a received selection of the system interpretation values assigned to the selected passcode sequence and system interpretation values different from those assigned to the selected passcode sequence during passcode validation after identifying a user;

encrypting the selected passcode system interpretation values; and storing the encrypted passcode and the property pattern in a user database.

The method for user passcode authentication consists of the following operations:

accessing a user information database comprising: at least one predefined passcode sequence comprising at least two user input option parameters, the at least two user input option parameters comprising at least two different variable properties of a group comprising: images, alpha-numeric characters, symbols, colors, patterns, sounds, textures, topology, location, orientation, relative position with respect to an interactive display interface, wherein each property is assigned a system interpretation value by which the property is identified by the system, wherein the properties are organized into property sets, each set comprising a distinct grouping of properties to be identifiable as a unit by the system, while also maintaining each property as individually identifiable, and each property set is assigned a set identifier to be used in referencing and identifying the property set, wherein the set identifiers of the property sets are stored as a property pattern of the passcode;

generating a random arrangement of input option parameters comprising the variable properties in the predefined passcode user input option parameters, the random arrangement of input option parameters also comprising different ones of said variable properties that are not part of the predefined passcode user input option parameters, wherein the input option parameters that are not part of the predefined passcode comprise system interpretation values, by which the property is identified by the system;

manifesting the random arrangement of input option parameters on the interactive display interface, wherein the interactive display interface presents an arrangement of at least two different virtual keys set in positions on the interactive display interface, and each virtual key presents an arrangement of at least two different input option parameters of the random arrangement of input option parameters;

receiving a selection of the interactive display interface virtual keys in the condition they were presented in the manifesting step, wherein the system receives all of the system interpretation values for all the input option parameters presented on the selected virtual keys, including the user input option parameters from the predefined passcode and the input option parameters that are not part of the predefined passcode; and comparing the system interpretation values of all of the received selection of interactive display interface virtual keys to the system interpretation values of the predefined passcode user input option parameters and eliminating all failed matches for each position in the passcode which do not belong to the property set specified in the property pattern stored for the same position in the password sequence, leaving only a single matching interpretation value for each position in the password sequence, wherein the resulting values are then encrypted and compared to the stored encrypted system interpretation values.

Both methods may configure:

user input option parameters to a specific user, allowing individual users to utilize input option parameters independent from or not available to other users;

a user interface to a specific user, allowing individual users to utilize user interfaces independent from or not available to other users.

user input option parameters and a user interface to a specific user, allowing individual users to utilize input option parameters and user interface combinations independent from or not available to other users.

In spite of their apparent advantages compared to the authentication methods discussed earlier, the methods depicted in US20160328552 are vulnerable to multiple observations of the passcode entry process. According to the patent itself, the probability of passcode disclosure is inversely proportional to the number of property sets utilized, the number of virtual keys defined for the interface configuration, the number of unique properties defined in each of the property sets, and the length of the passcode. That's right, but in case of eavesdropping, the main influencing factor is the number of observations and the probability of passcode disclosure for the average user will be quite high in case of multiple observations.

SUMMARY OF THE INVENTION

In view of the prior art described above, it is an object of the invention to provide a method for authentication, which is characterized by versatility, wide applicability and increased security (reliability of access to the system).

The object of the invention is solved by a method for authentication, including user passcode creation and user passcode authentication.

The user passcode creation includes:

1) receiving a selected passcode sequence comprising k elements ($E_1$, $E_2$, . . . , $E_k$) from a library with n elements distributed according to their distinctive property in q sets (e.g. numbers, letters, special characters, colours, textures, arrows, zodiac and other signs, logos, hieroglyphs, images, photos, other two-dimensional and three-dimensional objects), the passcode being received on the user interface, wherein each element $E_i$ ($i \in [1;k]$) is assigned a system interpretation value $VE_i$ ($i \in [1;k]$), by which the element is identified, and each property set is assigned a set identifier, wherein the set identifier of the set to which the element $E_i$ belongs is stored as a property pattern $PE_i$ with the passcode sequence for passcode validation;
2) encrypting the sequence of system interpretation values ($VE_1$, $VE_2$, . . . , $VE_k$) of elements ($E_1$, $E_2$, . . . , $E_k$) from the selected passcode; and
3) storing the encrypted sequence $H_s$ of system interpretation values ($VE_1$, $VE_2$, . . . , $VE_k$) of elements ($E_1$, $E_2$, . . . , $E_k$) from the selected passcode and their property pattern ($PE_1$, $PE_2$, . . . , $PE_k$) in a user database.

The user passcode authentication includes:

1) accessing a user information database comprising the encrypted sequence $H_s$ of system interpretation values ($VE_1$, $VE_2$, . . . , $VE_k$) of elements ($E_1$, $E_2$, . . . , $E_k$) from the selected passcode and their property pattern ($PE_1$, $PE_2$, . . . , $PE_K$);
2) generating and manifesting random arrangements of elements into selection fields $F_j$ ($j \in [1;v]$) on a login screen, one above the other (in separate layers) or next to each other, among which are also the elements ($E_1$, $E_2$, . . . , $E_k$) from the selected passcode;
3) receiving a selection of selection fields and identifying the elements in them that matter for the authentication using the stored property pattern;
4) encrypting the received sequence of system interpretive values of the identified elements;
5) comparing the encrypted sequence $H_x$ with the stored $H_s$ and granting access if there is a match ($H_x = H_s$) and denial of access if there is no match ($H_x \neq H_s$).

According to the invention, when receiving a selected passcode sequence, for each element $E_i$ from the passcode sequence ($E_1$, $E_2$, . . . , $E_k$) a user-defined rule $RE_i$ is received, where each rule $RE_i$ is assigned a systemic interpretation value $VRE_i$, through which the rule is identified, and at the request of the user (optional), rules $R_u$, not bound to any element, can also be received, where each rule $R_u$ is assigned a systemic interpretation value $VR_u$, and also, at the request of the user (optional), conditions and a way of submitting instructions $I_c$ can also be received, by which to amend element(s) and/or rule(s) during the authentication session, where each instruction $I_c$ is assigned a systemic interpretation value $VI_c$, where the systemic interpretation values of the rules and the conditions and the way of submitting the instructions are stored in the user database, and during an authentication session, instructions can be randomly generated and manifested on the login screen in order to amend for the current session element(s) of the selected passcode sequence and/or rule(s), and when identifying the elements that matter for the authentication, the instructions (if generated and manifested) and the rules are followed.

One login screen includes selection fields, each of which contains two or more elements. They can be the same and/or different number and type-two-dimensional, three-dimensional, including movable and each time manifested on the same or different background, or have the same or different colour and shape. The shape, colour, brightness, transparency, type, number of elements and fields can be changed, while maintaining the principle of placing more than one element in one selection field.

The elements can be numbers, letters, special characters, colours, textures, arrows, zodiac and other signs, logos, hieroglyphs, images, photos, other two-dimensional and three-dimensional objects (stationary or movable). They may also include user-uploaded objects, e.g. personal photos or parts thereof. Their number (n) is advisable to be large enough ($n \geq 30$).

The user, at his discretion, chooses k from n elements for secrets, and the remaining (n-k) elements become decoys. According to a variant embodiment of the method, in each selection field t elements from t different property sets are manifested, where $t \geq 2$, preferably t=4 or 5.

In each authentication session, the combination (order) of the elements in the selection fields is different and the user marks different fields each time with different combinations of elements in them, located in different positions on the login screen and in a way incomprehensible to the ordinary observer, thus protecting against security breaches even when the authentication process is under surveillance. This is especially true in the case where the secret elements serve only as reference points to which the rules and/or instructions apply and do not participate directly in the authentication process. Thus, the secret combination remains invisible to the ordinary observer.

According to a variant embodiment of the method, a rule $RE_i$ bound to element $E_i$ can be set by a logic model using the selected element as a starting point, by the shape of the selected element (e.g. pointing direction), by another element in the field of the selected element.

According to a variant embodiment of the method, when selecting elements, the user can set at least one logic model, i.e. to define at least one relation for at least one element, such as offset, directional jump, etc.

According to a variant embodiment of the method, some elements may indicate a direction (act as pointers).

According to a variant embodiment of the method, in each selection field there is an element, which is arrow, and the user can set a rule for one of his secret elements, requiring to follow the direction of this arrow.

According to a variant embodiment of the method, some elements representing two-dimensional or three-dimensional objects may be movable. For example, if a secret element is an arrow, it can change direction at intervals, and the field to which it points at the time of marking should be marked for successful authentication.

According to a variant embodiment of the method, the individual secret elements can be associated with different relations and in an authentication session the user may not mark a field in which a secret element is located at all or if he marks it, it may be by completely different occasion. In this way, secret elements can remain truly secret even when visually, video or another surveillance over the authentication process is in place. This ensures truly secret communication between the user and the device, system or service, while the user's motive for marking a field remains hidden from others.

Relations can determine distance, location, offset, addition, subtraction, association, or other connection or action.

Depending on the specific implementation of the method, the user navigates, follows or traces voice, text, video, associative or other relations and/or communications, modelling and changing his identification choice.

According to a variant embodiment of the method, the user can configure one or more logic models, which can be rotated cyclically. The logic models may be changed by instructions, which to violate cyclicity.

According to a variant embodiment of the method, a rule $R_u$, not bound to any element, is for example the rule for misleading manipulations, where the number (m) and position (p) of these manipulations are either user-specified constants or variables dynamically determined by the system and communicated secretly with the user, according to conditions defined by the user. In one possible variant, the user sets the number and position of misleading manipulations in the secret combination. In another possible variant, during the authentication session, the user receives instructions $I_c$, in a way incomprehensible to the ordinary observer, about the number of misleading manipulations and possibly the position in the secret combination to which they should be applied.

According to a variant embodiment of the method, a rule $R_u$, not bound to any element, is for example the rule for field selection performed in a certain way in order for the authentication to work (e.g. by pressing the field on one side only or swiping in a certain direction, or holding).

According to a variant embodiment of the method, simultaneously with the manifestation of a randomly generated combination of elements, additional information indicating a change is manifested. Additional information (instruction $I_c$) can be manifested on a separate line on the screen, incl. in the selection fields, using the elements themselves as indicating the necessary change (algebraic, geometric, associative or other). It may be manifested or broadcast on devices or systems other than the one through which the authentication is performed.

The change can also be agreed in advance in the form of "shared secret", incl. to be a shared secret combination that is common to more than one user and that complements or changes the personal secret combination of the users, according to the default settings, and the shared secret and the way of marking are known only to the agreed users and are not manifested and shown nowhere.

The use of such instructions in the authentication process increases the level of security, providing the opportunity for secret communication between system, device and user, without requiring additional resources or attention, thus ensuring easy integration and fast use, i.e. good usability.

According to a variant embodiment of the method, the instructions may appear continuously, cyclically, periodically or in another way, e.g. geographical (to appear for greater security when the user is outside his usual location (e.g. country)) or event-based (e.g. to appear when changing service provider or when 2 or more secret elements are encountered in one field), as convenient for the user and as he has set up the method to work.

According to various embodiments, the method may configure:

- user elements to a specific user, allowing individual users to utilize elements independent from or not available to other users;
- a user interface to a specific user, allowing individual users to utilize user interfaces independent from or not available to other users.
- user elements and a user interface to a specific user, allowing individual users to utilize elements and user interface combinations independent from or not available to other users.

The authentication can be used to provide access to:

- physical space, e.g. office, house, apartment, hotel room, shop, garage, parking, etc.;
- virtual space, e.g. web account, storage space, electronic folder, virtual wallet or account, etc.;
- a computer, mobile, or other communication or functional device, e.g. computer, mobile phone, smart watch, payment terminal, car, self-service machine, slot machine or console, etc.;
- applications, services, data, etc., e.g. applications for electronic (including mobile) banking, applications for communication (chat), applications for sharing (exchanging) files, applications with virtual or augmented reality, authentication services, encrypted files, etc.

The authentication method according to the present invention is applicable and works successfully in various physical, virtual and operational environments, the protection being achieved by combining secret elements with decoys and implicit rules defined by logic models, elements indicating direction, other elements, ways of marking, misleading manipulations that can be changed by hidden instructions.

Compared to the prior art, where the secret elements themselves are used directly for authentication purposes, in the proposed method this information is placed in selection fields that are handled and contain more than one element and is it is possible that the secret elements only direct which other fields to be marked.

The method significantly limits the possibilities of using standard methods for tracking user actions by recording key strokes and/or cursor movements (keyloggers), or taking screenshots (screen recorders), or surveillance, as visible actions do not reveal the secret combination. Also, the method is not vulnerable to brute-force attack (Dictionary attack) and does not require the use of additional security devices/keys of any kind.

The method allows a password with a higher degree of security to be entered relatively faster and much easier to remember. Without a security risk it can be applied on a device that is not owned by the user, as well as in public places. It doesn't suffer tradeoffs for usability (at the expense of security) or tradeoffs for security (at the expense of usability).

The method can also be used by transmitting the identification choice (the field sequence valid for the given session) via text, audio, video or another type of message, and instead of naming/indicating the secret elements or secret combination, naming/indicating the position of the fields that would provide access in the specific session.

The different combination of elements in the selection fields in each session protects the user from eavesdropping, especially when he does not mark the fields in which his secret elements are located, but other fields indicated to him in a manner and based on principle/principles (algebraic, geometric, associative, etc.) known only to him.

The method allows for a given operation or a given case the application of more than one secret combination applied by two or more user accounts, which allows more than one user to access shared information, shared resources, etc. through his secret combination, unknown to the other participants.

The method allows for a given operation or a given case the application of a secret combination shared between two or more users, common to more than one user account and complementing or changing the secret combinations of users using these user accounts, which provides protection even when sharing with the wrong addressee (recipient).

The method reduces the cognitive load for users, helps them to make fewer mistakes and give them a more pleasant experience.

DESCRIPTION OF THE DRAWINGS

Hereinafter, exemplary embodiments of the authentication method are presented in details, illustrated by the accompanying drawings:

FIG. 2—exemplary login screen with 12 selection fields (v=12).

FIG. 5—setting an exemplary secret combination X.

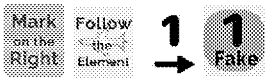

).

FIG. 6—exemplary authentication sessions with secret combination X activated.

Figure 6A:
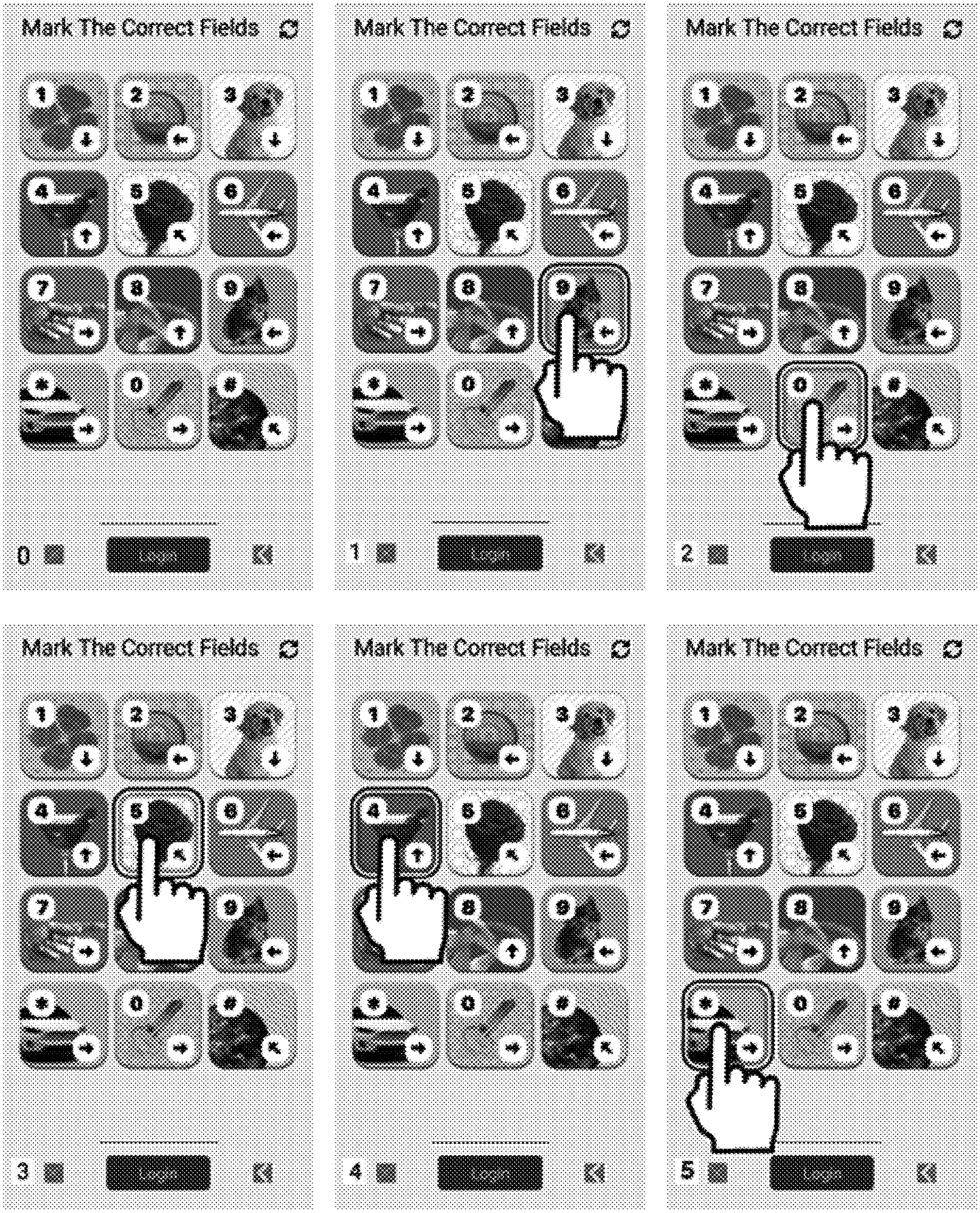

FIG. 6A—exemplary authentication session 1 with secret combination X activated.

Figure 6B:
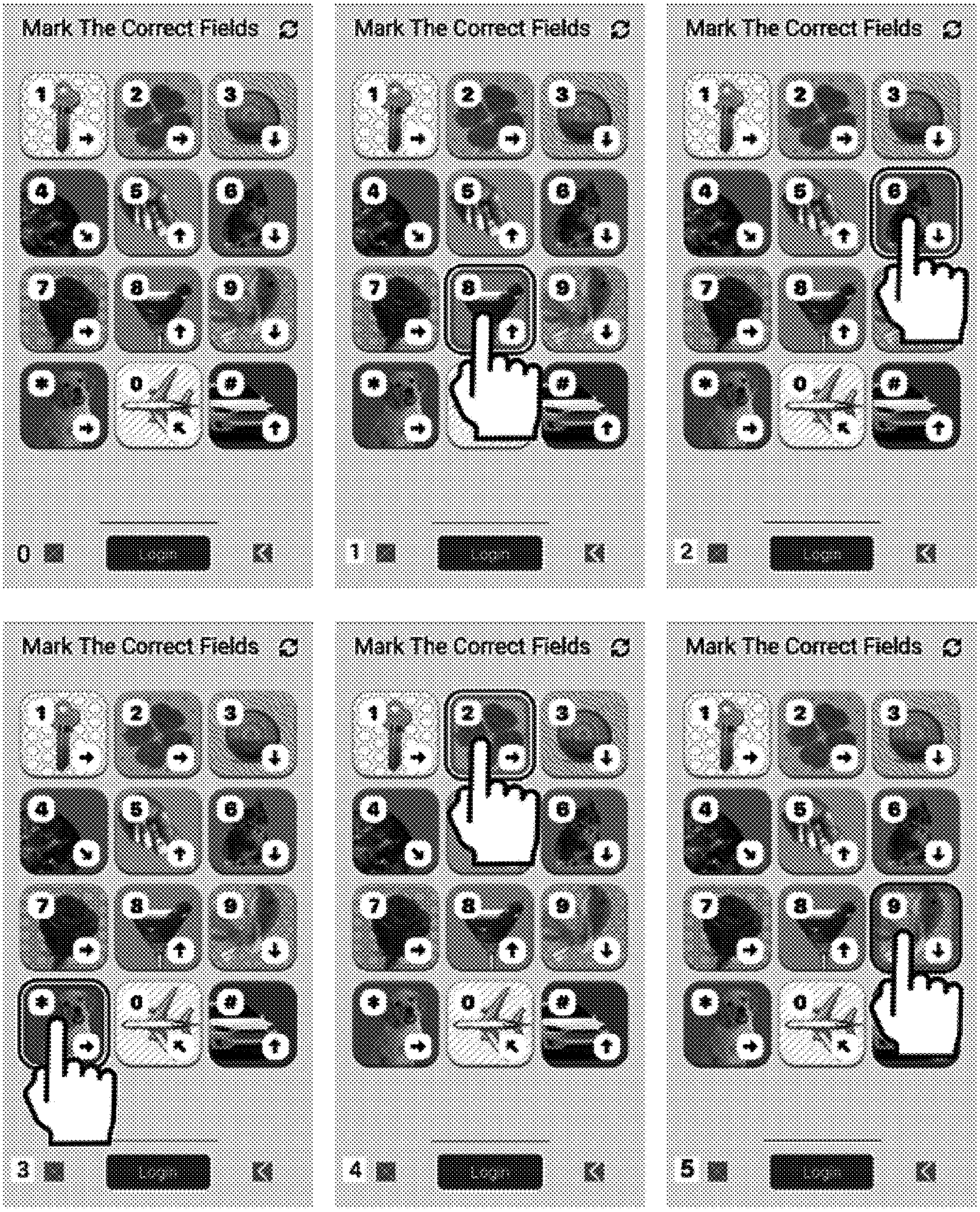

FIG. 6B—exemplary authentication session 2 with secret combination X activated.

FIG. 7—exemplary authentication session 3 with secret combination X activated with detailed explanations.

Figure 7A:

FIG. 7A—exemplary authentication session 3 with secret combination X activated with detailed explanations for step 1.

Figure 7B:

FIG. 7B—exemplary authentication session 3 with secret combination X activated with detailed explanations for step 2.

Figure 7C:
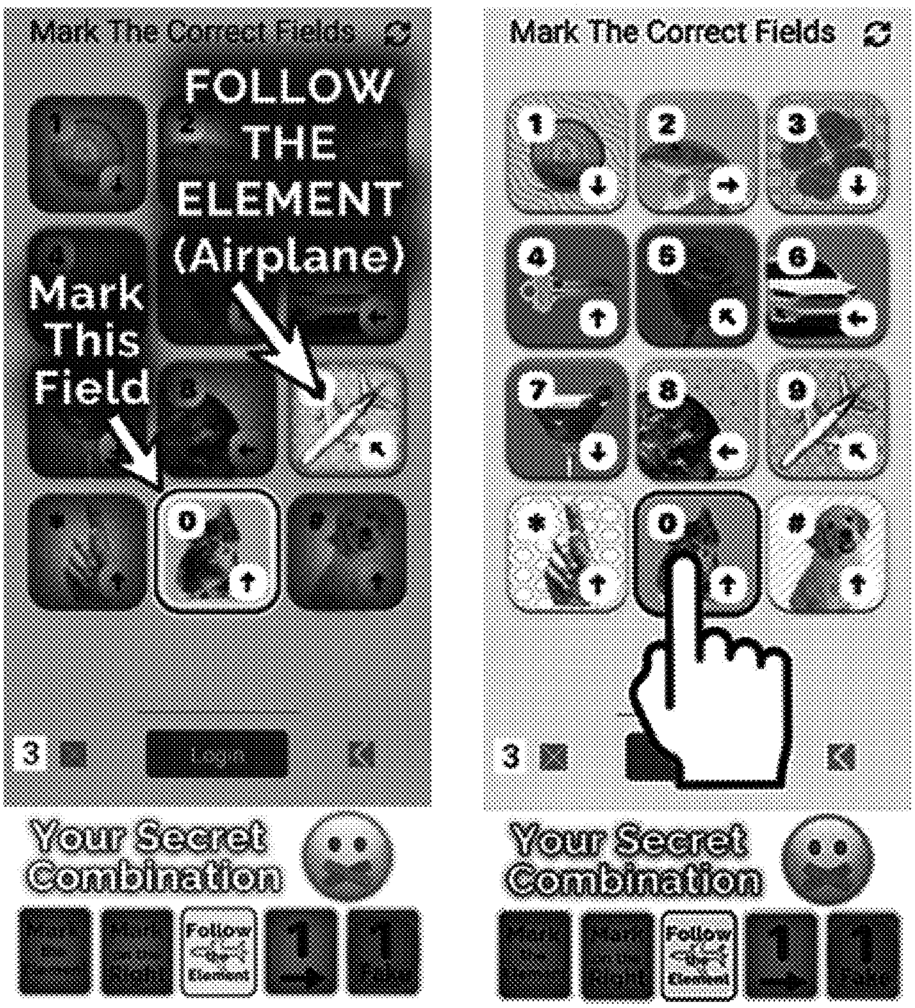

FIG. 7C—exemplary authentication session 3 with secret combination X activated with detailed explanations for step 3.

Figure 7D:

FIG. 7D—exemplary authentication session 3 with secret combination X activated with detailed explanations for step 4.

Figure 7E:

FIG. 7E—exemplary authentication session 3 with secret combination X activated with detailed explanations for step 5.

Figure 8:
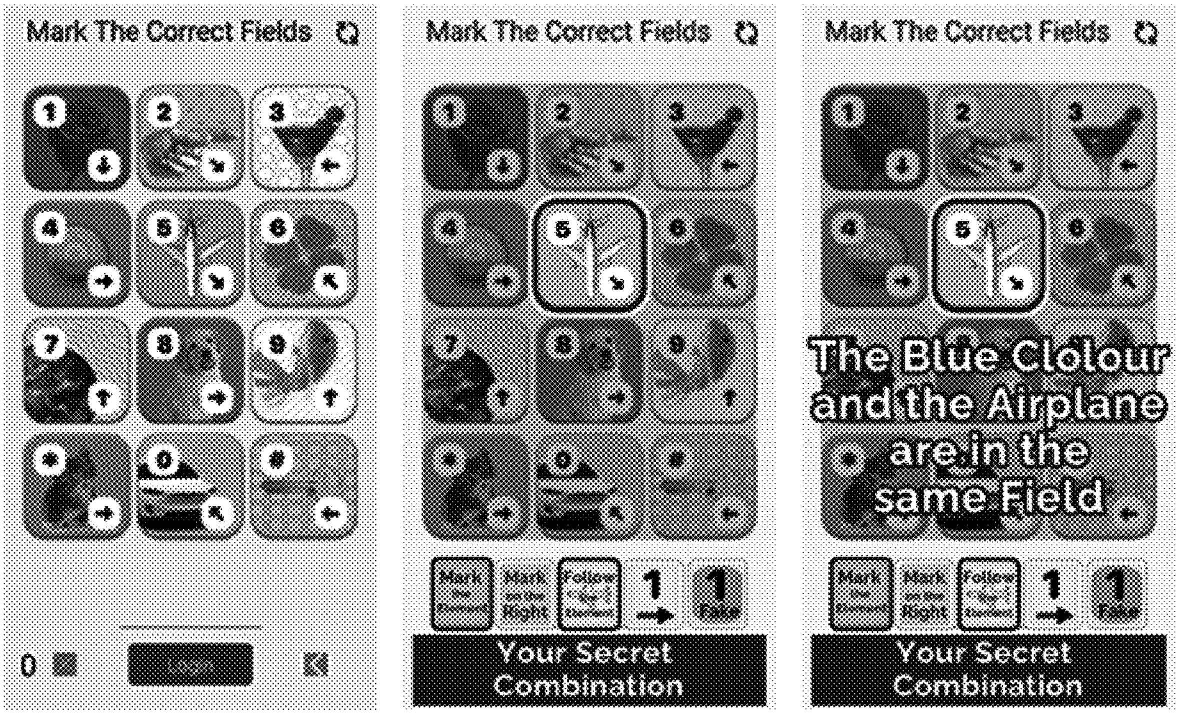

FIG. 8—exemplary placement of more than one secret element in one selection field with secret combination X activated.

Figure 9:
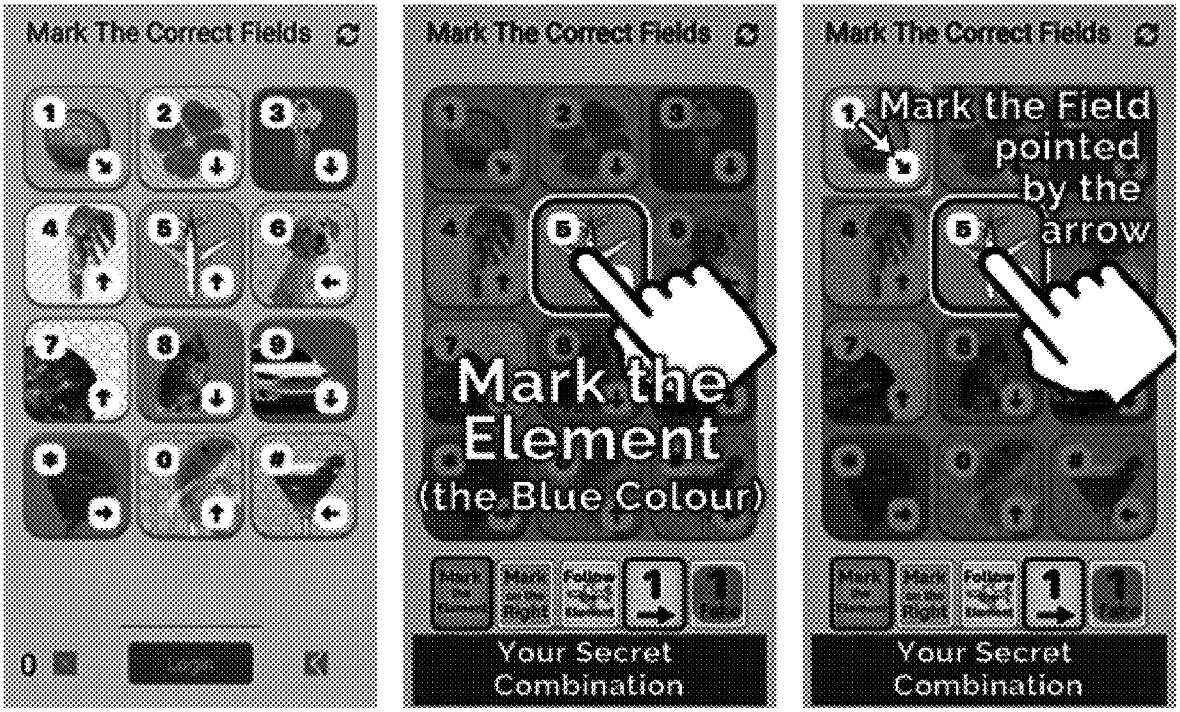

FIG. 9—exemplary marking of one selection field more than once with secret combination X activated.

Figure 10:
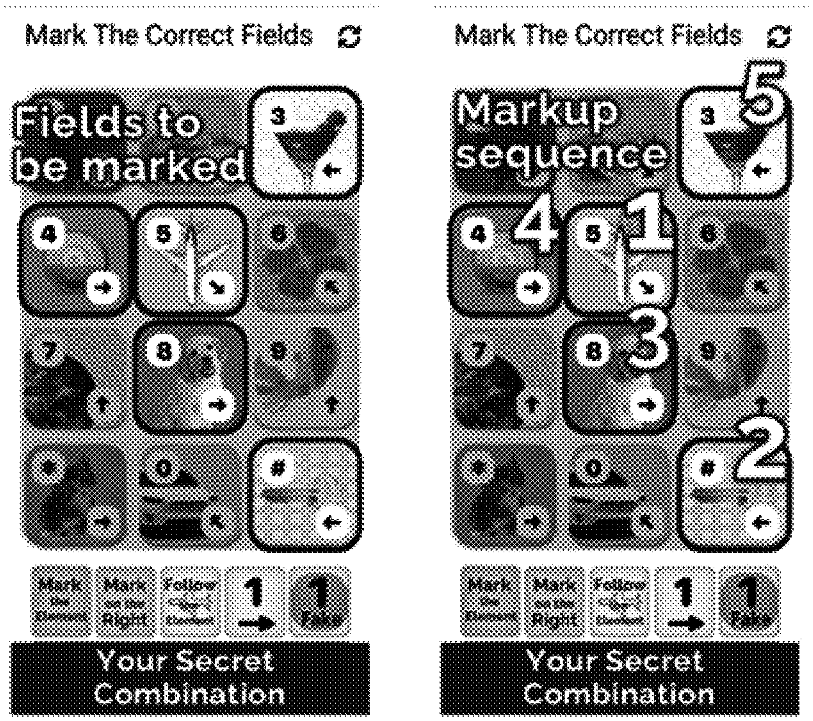

FIG. 10—exemplary identification choice with secret combination X activated.

Figure 11:
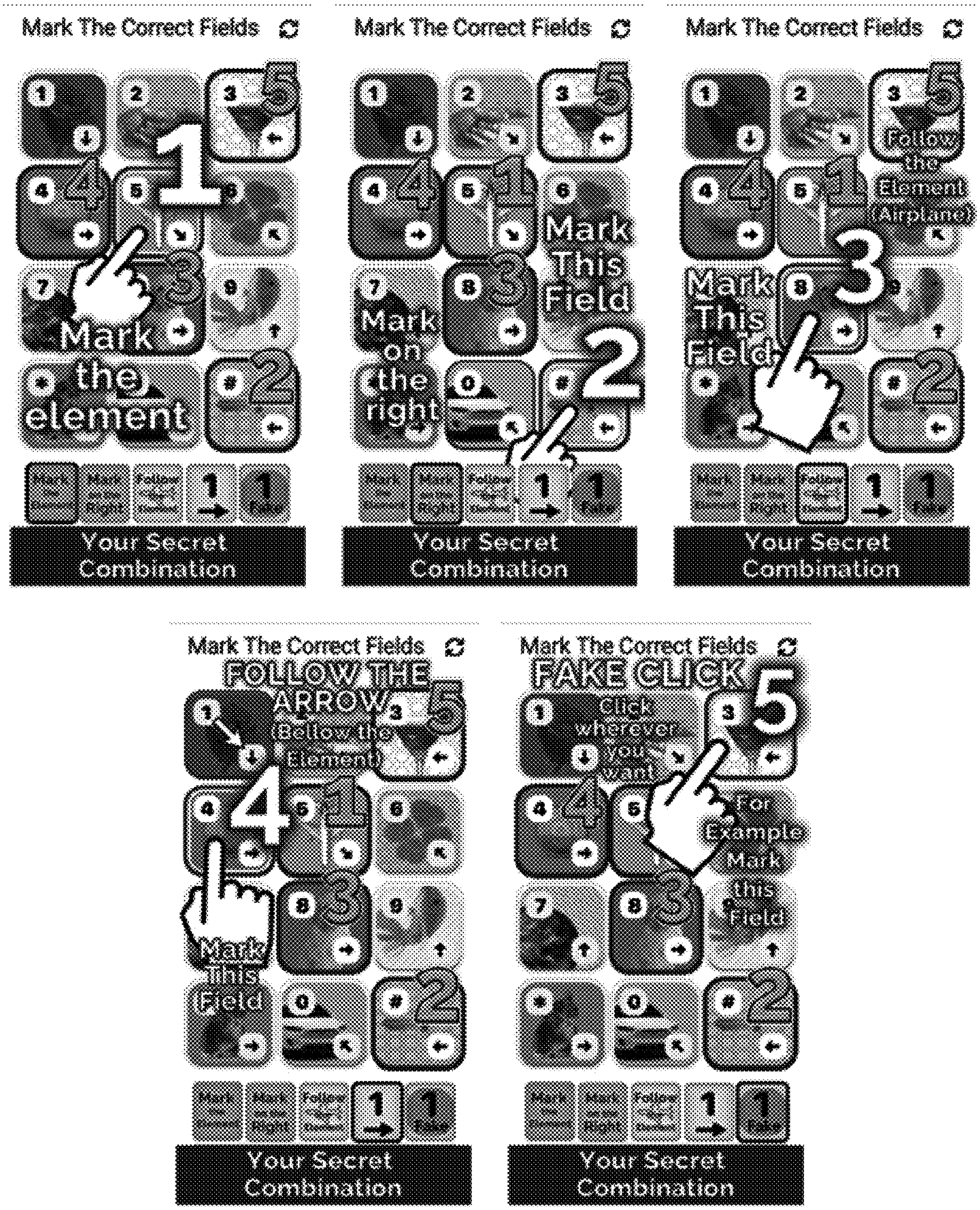

FIG. 11—exemplary identification choice with secret combination X activated with detailed explanations.

Figure 12:

FIG. 12—exemplary instruction for changing the identification choice based on a change of a secret element.

Figure 13:
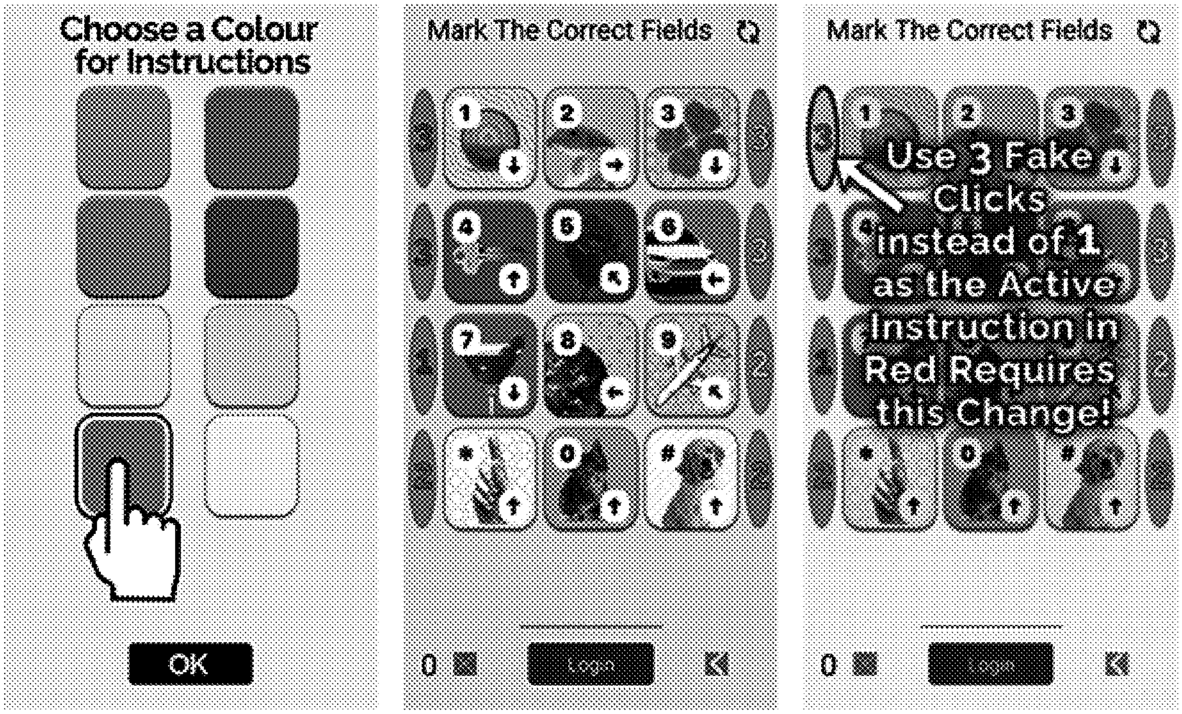

FIG. 13—exemplary instruction for changing the identification choice based on a change in the number of misleading manipulations.

Figure 14:
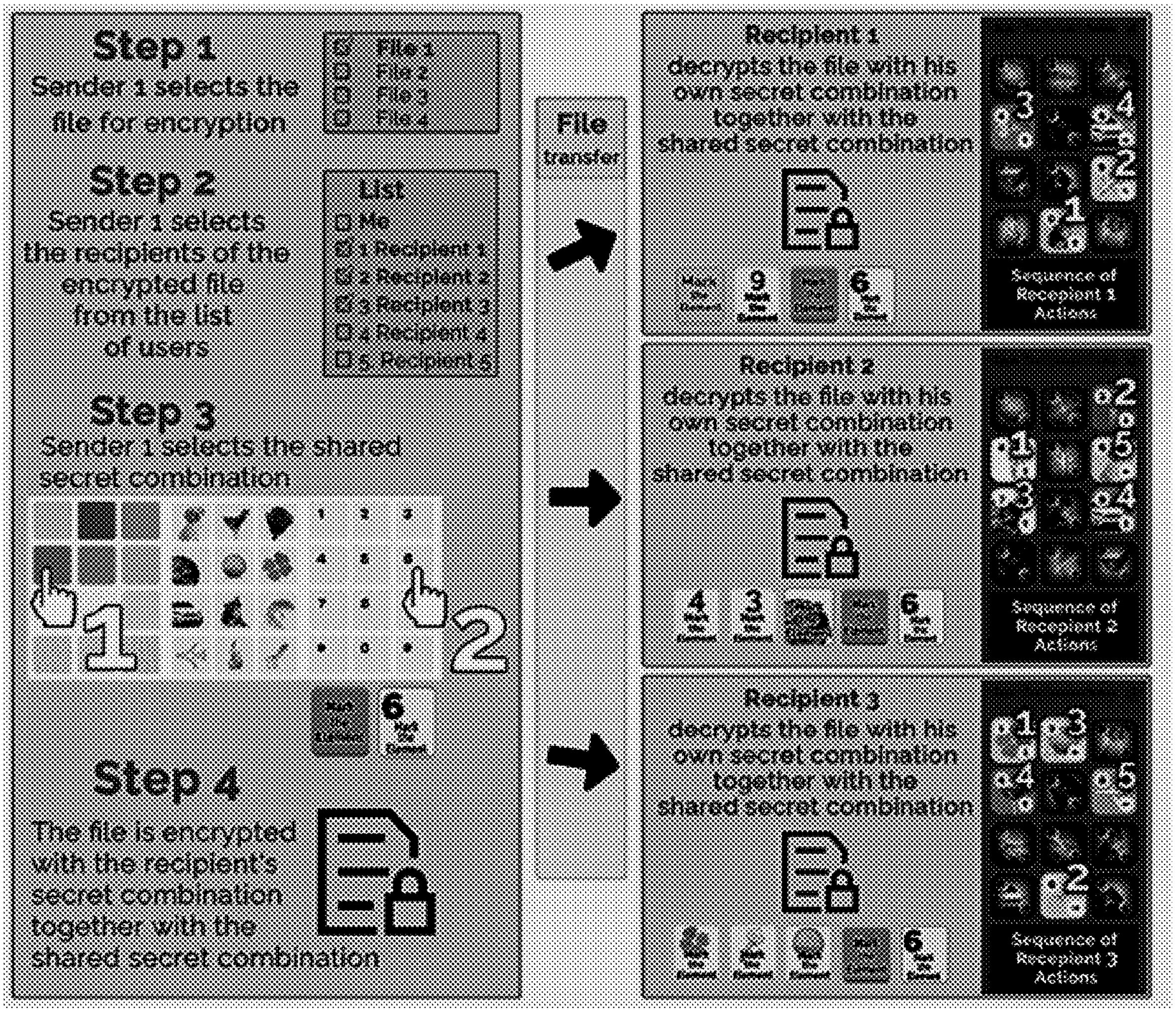

FIG. 14—exemplary application of a "shared secret" by several users.

Figure 15:
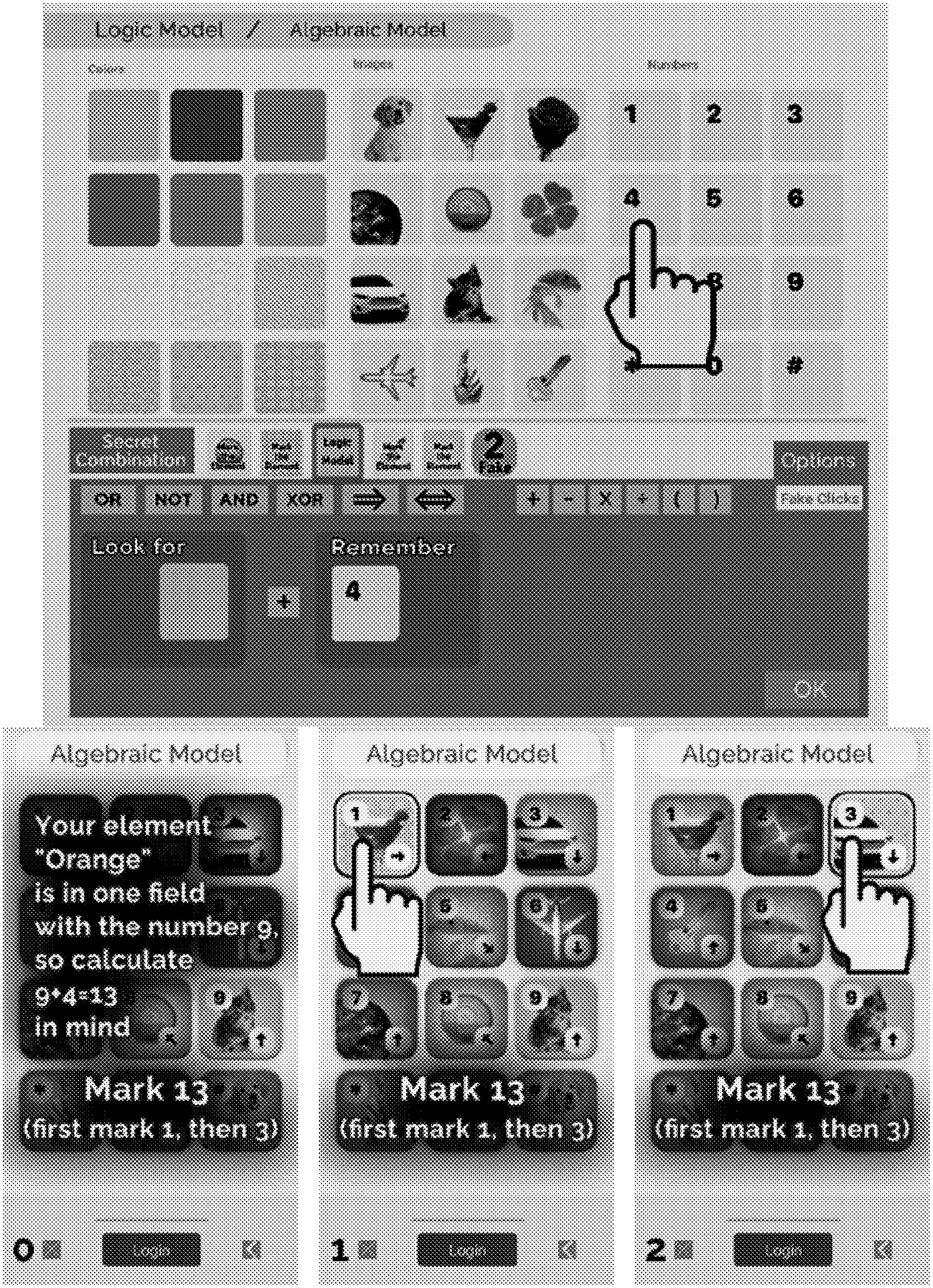

FIG. 15—exemplary defining an algebraic logic model.

Figure 16:

FIG. 16—exemplary defining an associative logic model.

Figure 17:

FIG. 17—exemplary defining a custom logic model.

Figure 18:
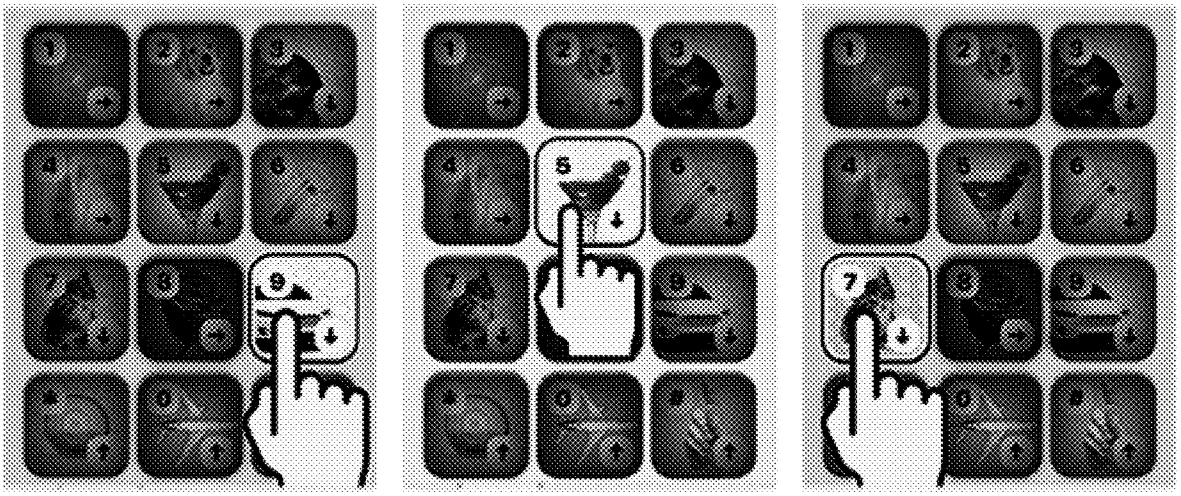

FIG. 18—exemplary authentication session 1 with secret combination Y activated, illustrating how secret elements can remain secret even under visual, video or another surveillance over the authentication process.

Figure 19:
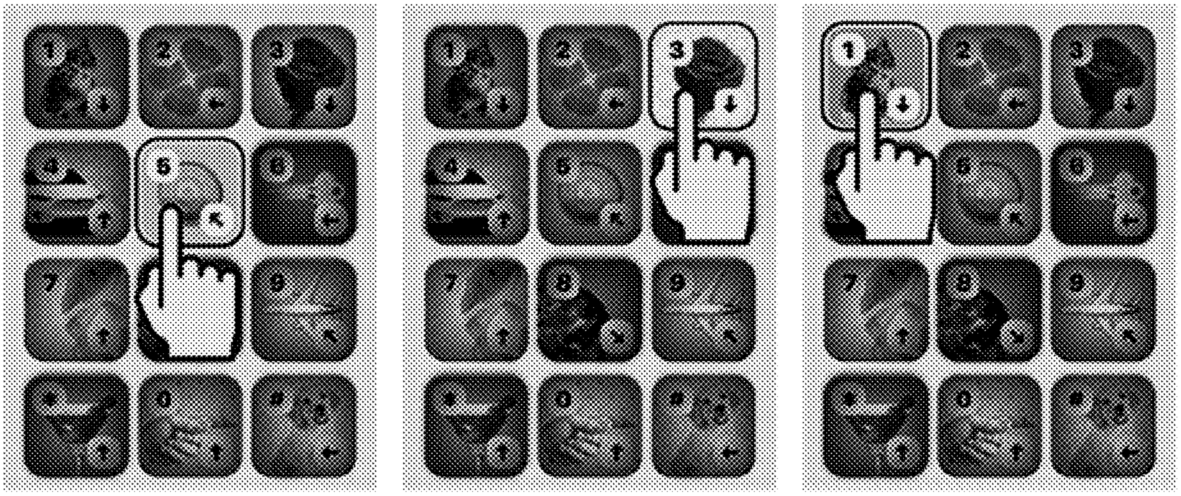

FIG. 19—exemplary authentication session 2 with secret combination Y activated, illustrating how secret elements can remain secret even under second visual, video or another surveillance over the authentication process.

EXAMPLE IMPLEMENTATION OF THE INVENTION

Hereinafter, an exemplary embodiment of the authentication method will be presented, the described sequence of operations and their characteristic parameters being applied in various embodiments and modifications using numbers, letters, special characters, colours, textures, arrows, zodiac and other signs, logos, hieroglyphs, images, photos, other two-dimensional and three-dimensional objects, or parts of them, whose grouping, arrangement and combination in selection fields has an equivalent action or functional purpose and provides the described beneficial effect of using the method. In this sense, the exemplary implementation of the method should be considered and interpreted to illustrate the idea of the proposed technical solution, which does not limit the use of other variants. Aspects of the present invention have been described in connection with the application of the method according to the embodiments of the invention. It should be understood that each login screen, each selection field, all elements in them and their combinations, can be applied by reading program instructions from a computer or another device.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the various embodiments are to be accorded the widest scope consistent with the principles and features disclosed herein. While the present invention is disclosed by reference to the preferred embodiments and examples, it is to be understood that these examples are intended in an illustrative rather than in a limiting sense.

The terminology used hereinafter is for the purpose of clarifying the description of specific embodiments and is not intended to limit the invention. The terms used herein usually have their usual meanings in the art. In the event of any inconsistency, this document, including all definitions given here, shall prevail. The same thing can be expressed in more than one way. Alternative language and synonyms may be used for term(s) discussed here, and no particular importance should be given to whether a term is developed or discussed here. Consideration of one or more synonyms does not preclude the use of other synonyms. Singular forms are intended to include multiple forms, unless the context clearly indicates otherwise.

The terms "includes" and/or "including", when used in this description, specify the presence of the specified characteristics, integers, steps, operations, elements and/or components, but do not exclude the presence or addition of one or more other functions, integers, steps, operations, elements, components and/or groups thereof.

The term "operating system" means a computer system, a computer device, a mobile communication device, a payment system, an access control system for buildings, offices, premises or any other system or device requiring authentication upon entry.

The term "element" means an object that the system offers for use in the process of user authentication in a given operating system. The elements can be numbers, letters, special characters, colours, textures, arrows, zodiac and other signs, logos, hieroglyphs, images, photos, other two-dimensional and three-dimensional objects (e.g. the ones depicted in FIG. 1). The method allows the selected elements to be the same or different in type, to differ in size, colour, raster, direction, etc. Their main purpose is to enable the user to choose easily recognizable and memorable secret elements.

The term "secret element" means an element selected by the user during passcode creation for authentication purposes. In various situations, "selected element" and "element from the secret combination" can be used as substitutes for this term. Secret elements are chosen from the library with elements (FIG. 1) as described in FIG. 5.

When opening an authentication session, the user should mark the selection fields, determined by secret elements and rules. If the user has previously chosen to work with not one but a set of secret elements, it may be that in a given session he will need to mark a given selection field more than once (FIG. 9).

The term "element that matters for the authentication" means an element referred to by current instructions and rules as a potential secret element.

Figure 2A:
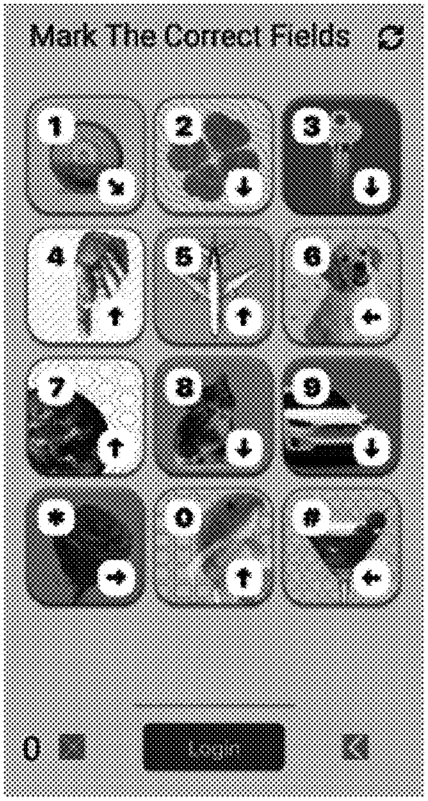
FIG. 2A—exemplary rectangular login screen.
Figure 2B:
FIG. 2B—exemplary circular login screen.
Figure 3:
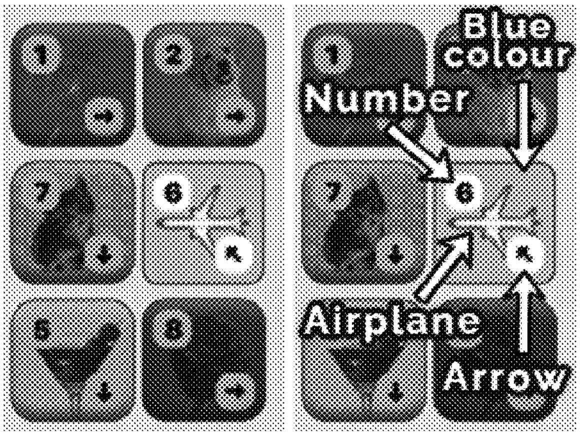
FIG. 3—exemplary selection field with 4 elements (t=4).
Figure 4:
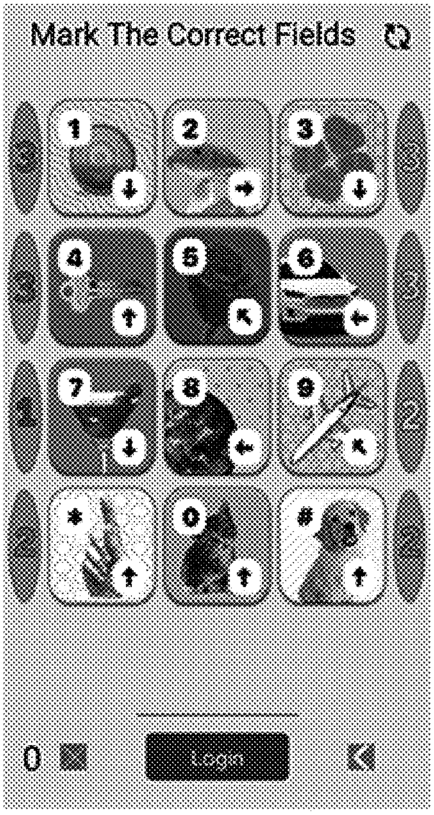
FIG. 4—exemplary instruction given in modules located on the side of the selection fields.

The term "login screen" (FIG. 2) indicates the work area of the screen in which the selection fields are located (FIG. 3). It may also contain instructions for the user (FIG. 4). It also houses all other functional areas and parts needed by the system, such as refresh button , clear button , back button , login button and a counter of markings. It can be of different shapes, e.g. rectangular (FIG. 2A), circular (FIG. 2B), polygonal.

The term "selection field" (FIG. 3) indicates a part of the login screen (FIG. 2), in which a group of elements is placed. In various situations, "input option", "virtual key", "tile" can be used as substitutes for this term. The field may be defined with clear boundaries, location, and outlines, but may not be clearly delineated and specifically localized. Its main function is to group secrets and decoys in one place. In a session, the user should mark the selection fields, determined by the secret elements and rules (FIG. 5), or according to the instructions (FIG. 4).

In any selection field the elements should be more than one (t≥2). Thus, the reason for which the user marks a given selection field remains unclear to others who observe or record his actions during the authentication session. As a result, if a third party uses spyware or watch the authentication session, he will not be able to understand why the user marks it.

The selection fields in the login screen may have a fixed shape, location, size, and outline, or parameters that are set for an authentication session. According to a preferred embodiment of the method, the size and shape of the login screen and the selection fields are tailored to the particular user device. According to some embodiments, individual users can utilize user elements and user interface combinations independent from or not available to other users.

The main purpose of the selection field is to enable the user to find in it his secret element or to recognize his instructions. Thus, he orients himself whether to mark the field in which the secret element is located or to perform another action—to mark another field, based on the predefined rules or received instructions.

Figure 1:
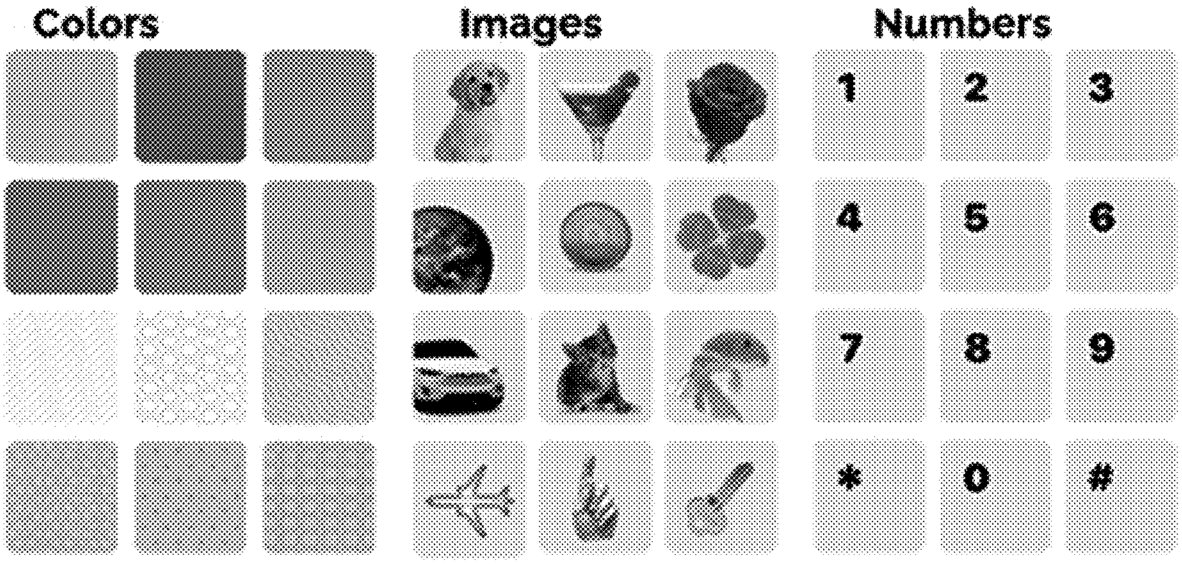
FIG. 1—exemplary library with 36 elements (n=36).

The term "property" denotes a distinctive feature of an element. The group of elements characterized by the property PE; is called a set of class $PE_i$, e.g. the elements "orange", "purple", "green", "red", "pink", "blue", etc. depicted in FIG. 1 are a set of class "Colors"; the elements "dog", "cocktail", "rose", "Earth", "coin", "clover", etc. are a set of class "Images"; elements 1, 2, 3, 4, 5, 6, etc. are a set of class "Numbers".

The term "rule" means the principle of operation defined by logic model, by element shape (e.g. element which, by its form, indicates direction), by another element in the field of the selected element, by misleading manipulation, by way of marking (e.g. marking only one side of the field or swiping in a certain direction, or holding for a while).

Figure 5A:
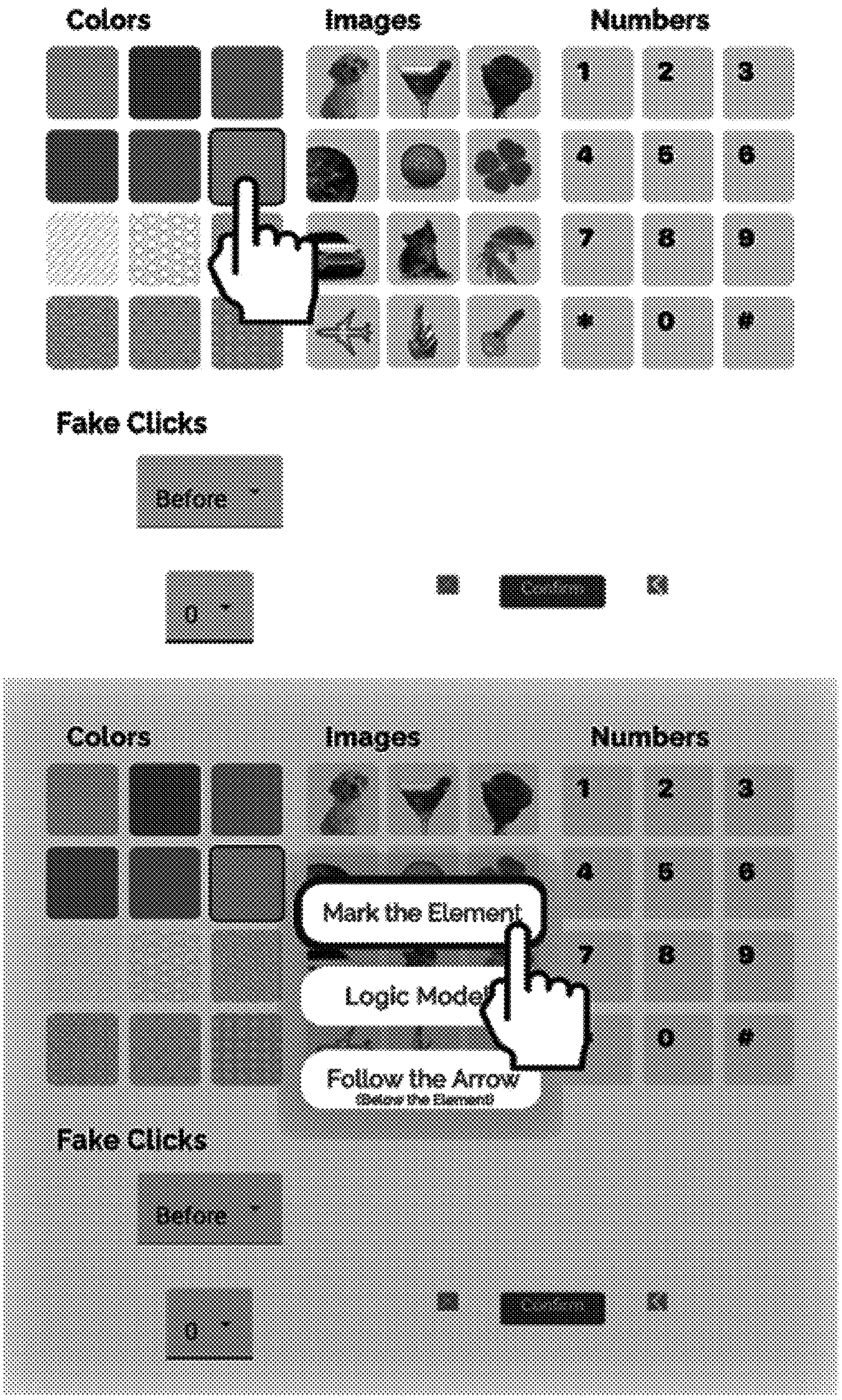
FIG. 5A—setting secret element № 1 from an exemplary secret combination X by selecting the option to mark the secret element № 1.
Figure 5B:
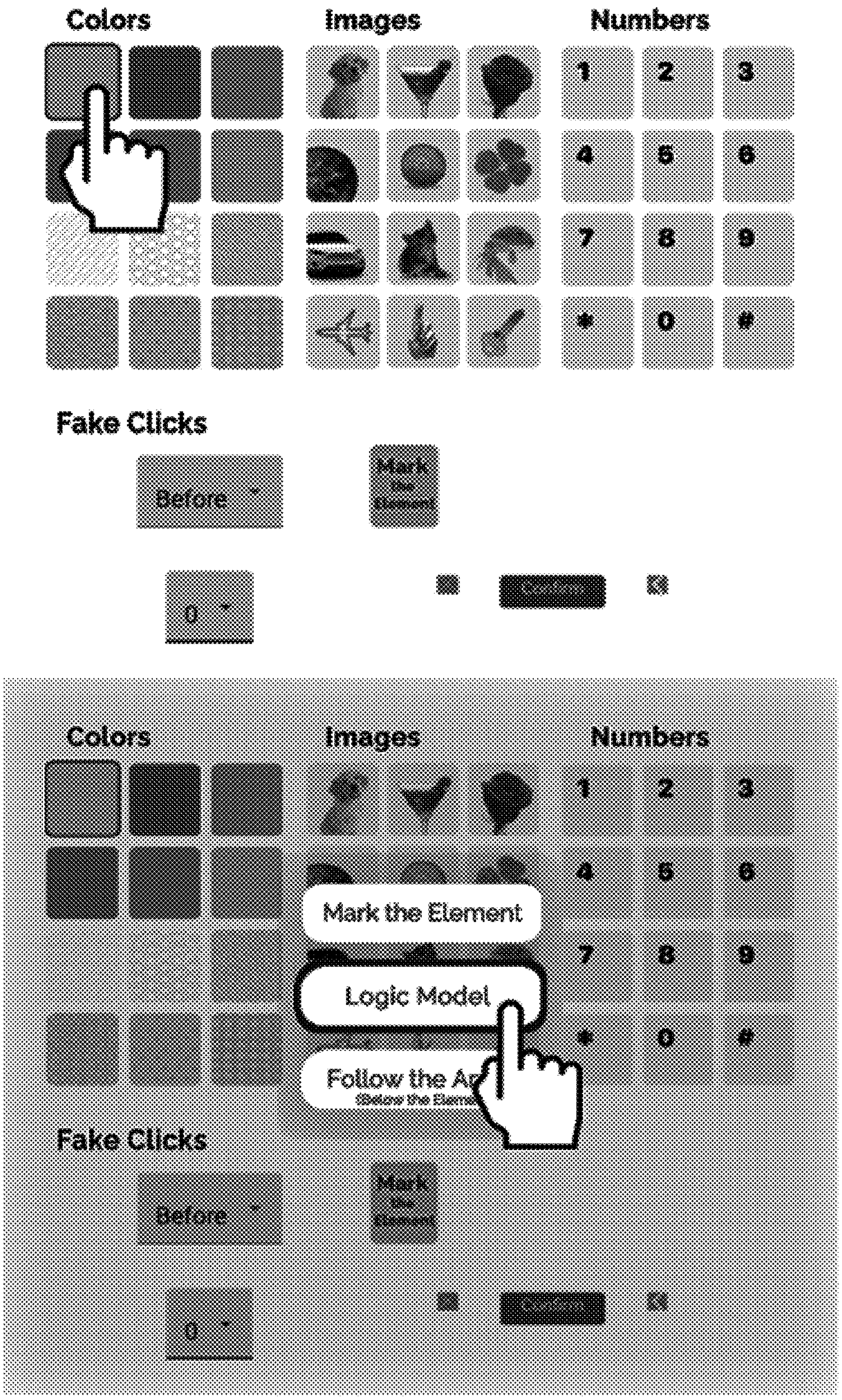
FIG. 5B—setting secret element № 2 from an exemplary secret combination X by selecting the option to use a logic model.
Figure 5C:
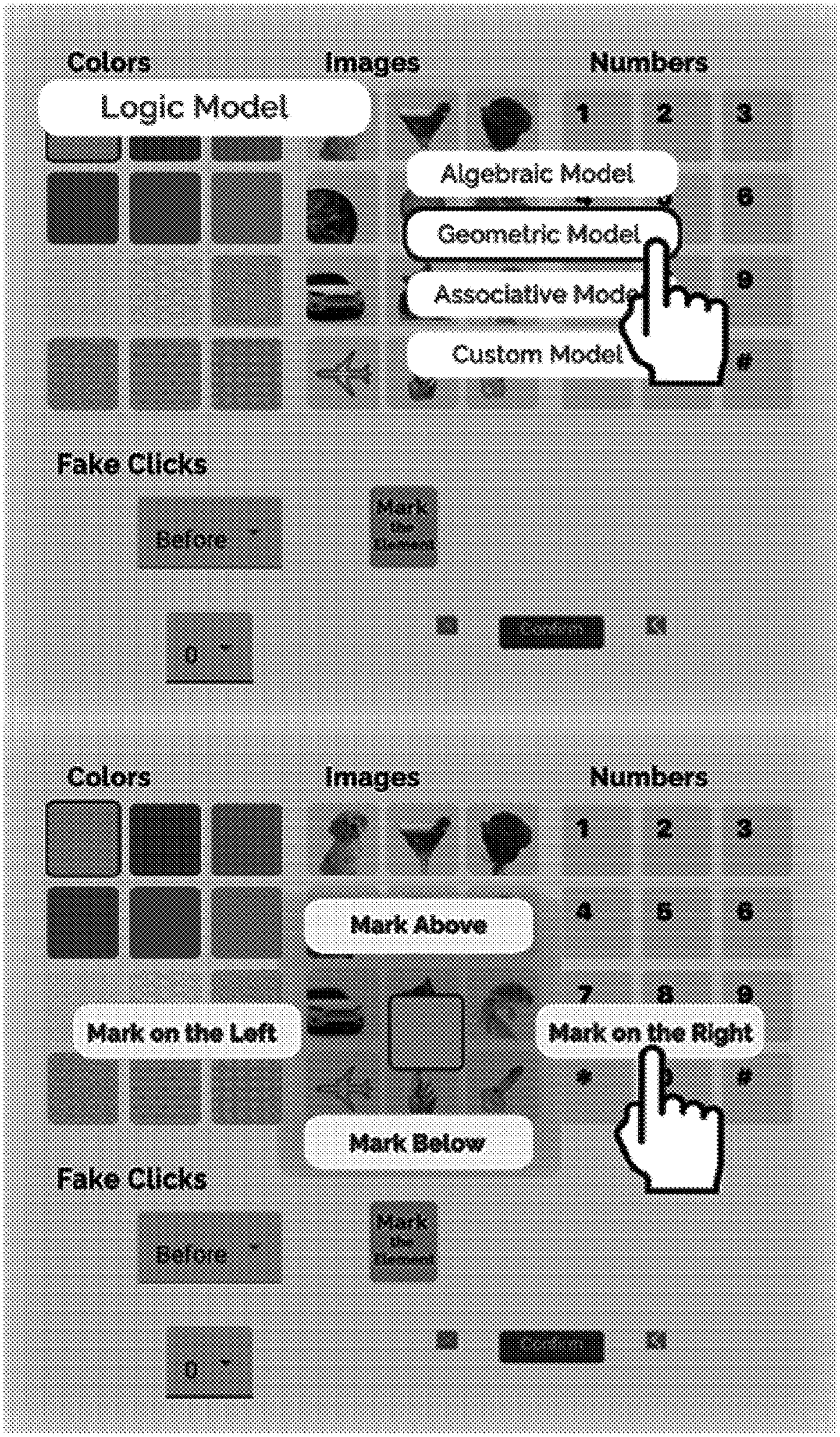
FIG. 5C—selection of a geometric logic model with marking on the right of secret element № 2.
Figure 5D:
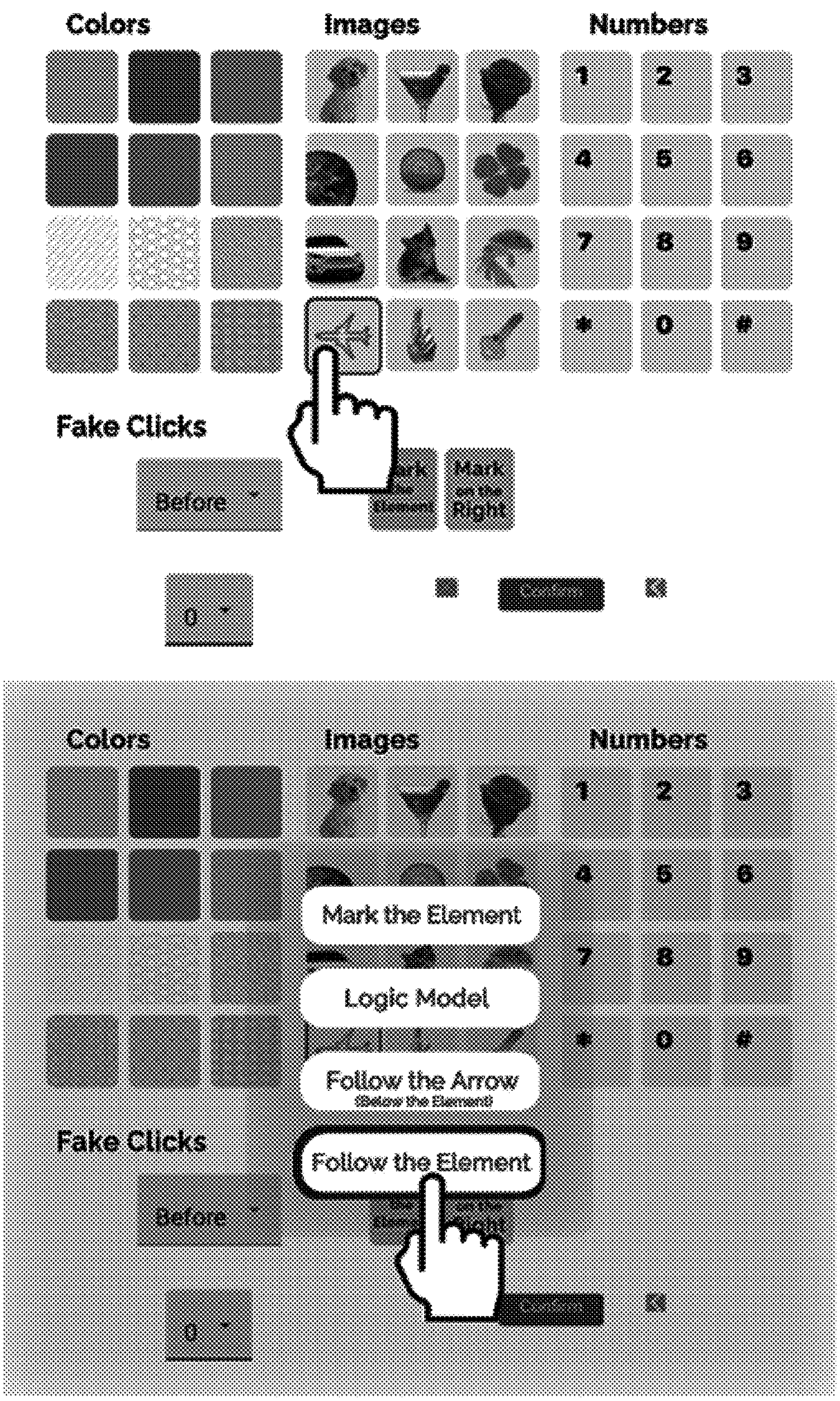
FIG. 5D—setting secret element № 3 from an exemplary secret combination X by selecting the option to follow the direction indicated by secret element № 3.
Figure 5E:
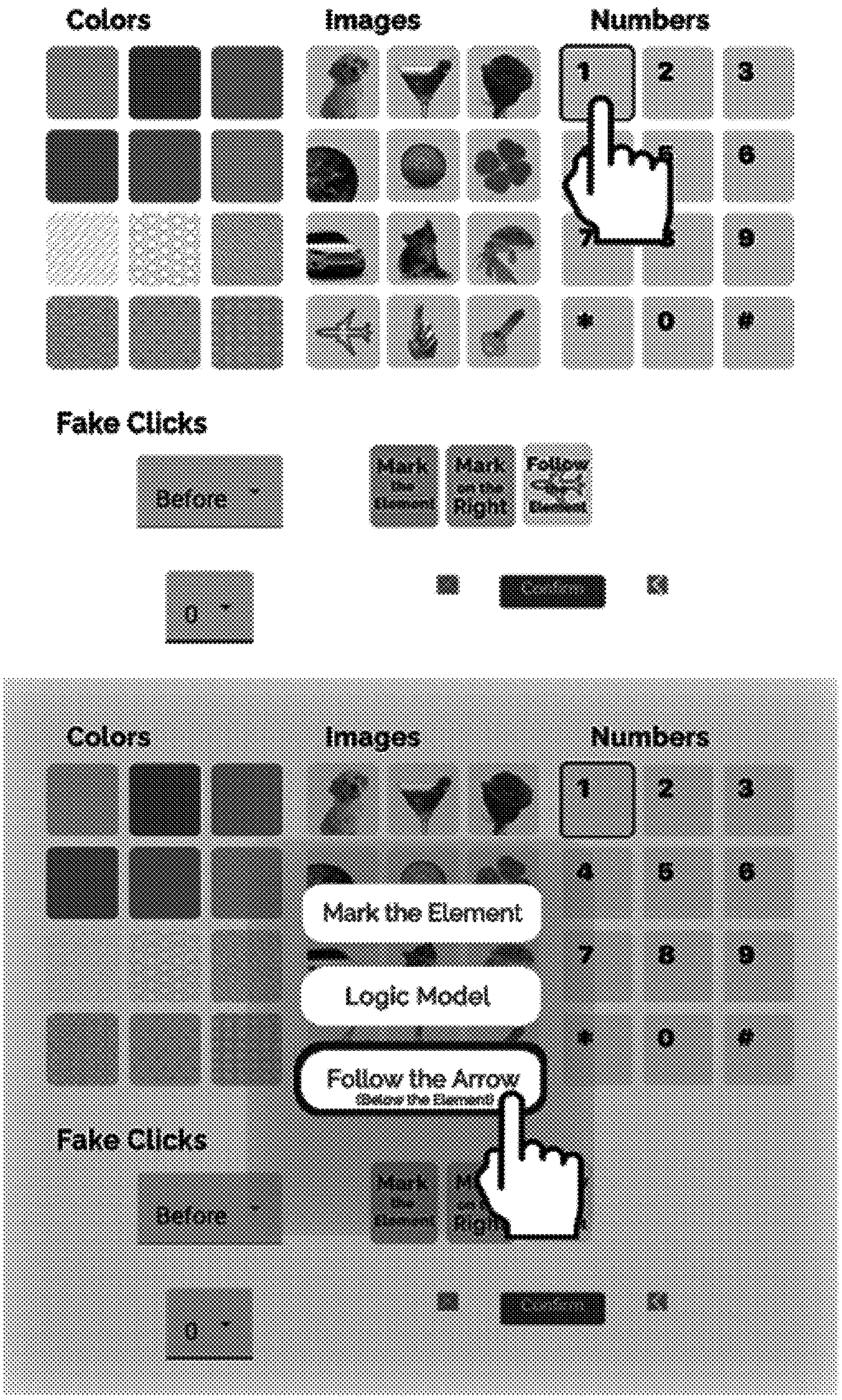
FIG. 5E—setting secret element № 4 from an exemplary secret combination X by selecting the option to follow the direction of the arrow in the selection field in which the secret element № 4 is.
Figure 5F:
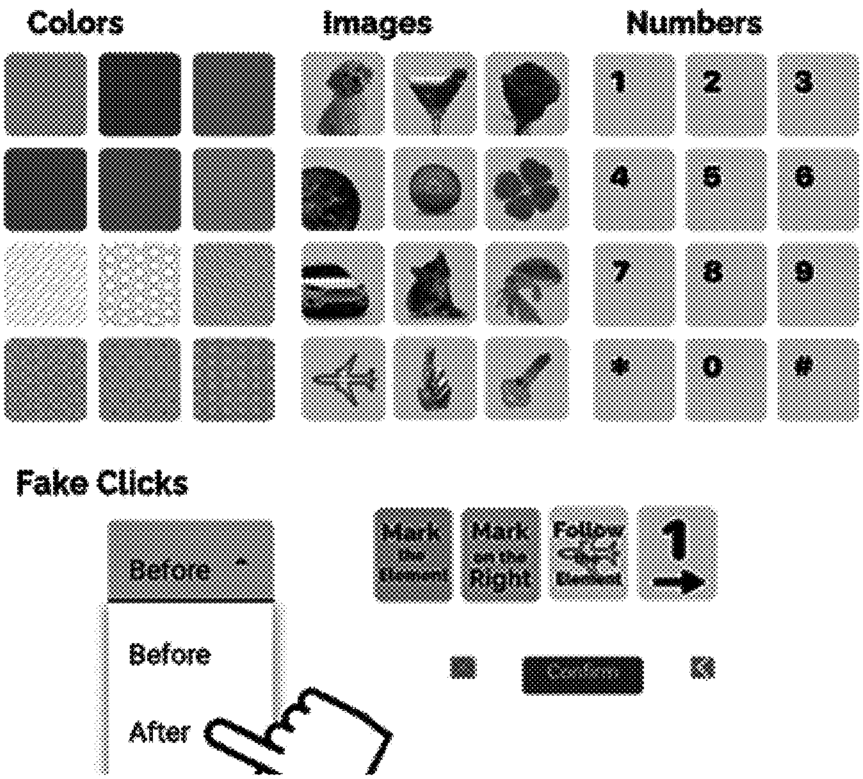
FIG. 5F—setting a misleading manipulation after the last secret element in an exemplary secret combination X.
Figure 5F:
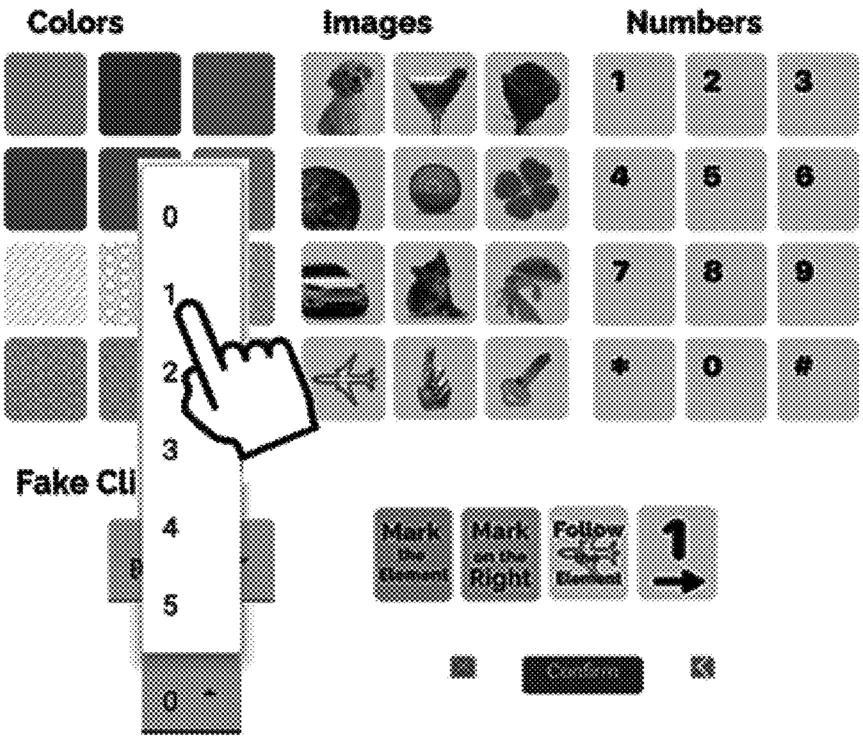
Figure 5G:
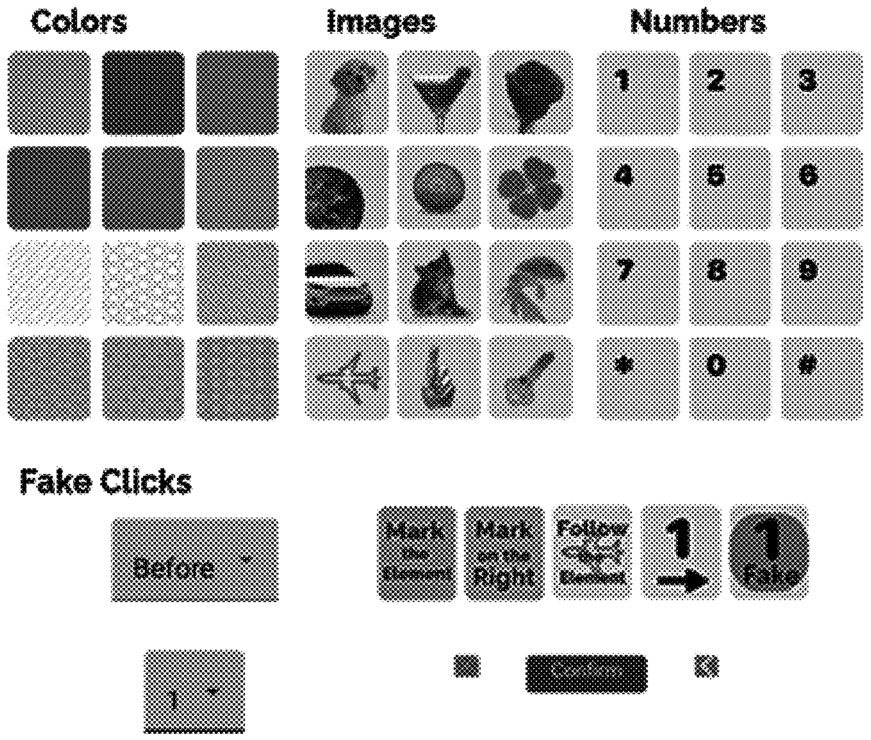
FIG. 5G—exemplary secret combination X (

The term "secret combination" denotes the sequence of secret elements and rules (FIG. 5G).

In embodiments of the method, the elements in the selection field can be manifested in layers or next to each other (FIG. 3).

The term "authentication session" (FIG. 6, 7, 18, 19) covers the set of actions that are performed by the user, within a predetermined period of time, to authenticate or log in to a service, device or system, or in relation to information. After each unsuccessful authentication attempt, the authentication session closes and the user must open a new session, during which he must enter the identification choice valid for the respective session.

The term "instruction" means an indication requiring certain actions in relation to a secret element or rule, within a given authentication session. The instruction determines the order and the way of changing a secret element or rule, without being understandable to others.

The instructions may be located in specially designated areas, for example on the periphery of the login screen (FIG. 4), as well as in the selection fields. Another variant embodiment is possible, in which the elements themselves or part of them serve as instructions for action within a given authentication session. The terms and conditions for submitting instructions are pre-set in the system or device settings, if the system and device allow such instructions to be executed (FIGS. 12 and 13).

Instructions are given by the system and may be visible in the selection fields or in a separate module (FIG. 4), device or system. Through them the user is informed about the necessary actions within a given authentication session.

The instructions may be masked using the elements themselves. The user's actions depending on the specific instructions may be based on different principles (algebraic, geometric, associative, etc.), which are pre-set by the user.

The term "instruction module" refers to the place in the login screen, in which the user receives the instructions of the system. In addition to instructions, misleading information may also appear in it.

The term "shared secret" means a secret combination pre-arranged between several users. The shared secret complements or changes the secret combinations of the users, not being manifested and shown anywhere, remaining known only to them. In a given authentication session, in relation to a given operation, in order to achieve successful authentication, each user must apply his own secret combination plus the shared secret (FIG. 14). This can be done in one step using a combination of the own secret combination and the shared secret, or in several steps, first making an identification choice based on one secret combination and then an identification choice based on the other secret combination, which is the shared secret combination.

The term "logic model" determines logical connection (relation) set on an algebraic, geometric, associative or custom principle, using operations such as addition (+), subtraction (−), multiplication (×), division (÷), displacement (shift, offset) (Δx), conjunction (⋀), disjunction (⋁), negation (¬), exclusionary disjunction ($\underline{\vee}$), implication (⇒), double implication (⇔). For example, if the logical model has defined a shift with one field to the right, then the field to the right of the secret element should be marked.

The term "misleading manipulations" refers to meaningless, camouflage (fake) manipulations (clicks) on the login screen, which are performed by the user to deceive malicious observers. Their number in a given authentication session may be pre-fixed or specified by the system through the elements or through additional modules and fields in the login screen.

The term "way of marking" generally speaking means a model for selection of the selection fields. It is defined in advance by the user in the system and if it is not met, despite all other conditions being met, the authentication will not be successful. Examples of way of marking are swiping, partial marking, side marking, holding. The model can be activated by the system under certain conditions, for which to inform the user through secret instructions in specially designated areas of the login screen or through the elements themselves, selection fields, their shape, location, distance, etc., as well as by additional visual or audio means in the login screen or outside it, incl. in other devices or systems.

Identification choice (FIG. 10, 11) is the action of the user in the login screen, in a given authentication session, which is based on the secret combination and takes into account the active instructions and rules. The identification choice is a combination and a set of:

1) identification of the fields in which the secret elements are located;
2) compliance with the active instructions, if any;
3) compliance with the active rules.

All of them can lead to specific manipulations with the selection fields, on the login screen, or parts of it, as well as to the omission or recurrence of an action. For example, in one authentication session is possible given selection field to be marked more than once, because there may be more than one secret element in it (FIG. 8) and for this reason the user should mark the selection field two or more times, or because a field is specified for marking by instructions in a given authentication session or by a rule (FIG. 9).

The valid identification choice grants access.

The identification choice can be communicated by naming/indicating the location of the fields that would provide access in the specific session. For example, in the authentication session shown in FIG. 6A, the naming/indicating will be as follows: press field 9, then press field 0, then press field 5, then press field 4, finally press field *. In the next session, the secret elements will be arranged differently and the identification choice will not be the same. In the session shown in FIG. 6B, the naming/indicating will be as follows: press field 8, then press field 6, then press field *, then press field 2, finally press field 9.

The authentication method includes conducting operations in sequence as follows:

When creating user passcode:

1) receiving a selected passcode sequence, for example comprising 4 elements ($E_1$, $E_2$, $E_3$, $E_4$) from a library with 36 elements distributed according to their distinctive property in 3 sets (colors, images, numbers), the passcode being received on the user interface (e.g. as shown in FIG. 5), wherein each element $E_i$ ($i \in [1;4]$) is assigned a system interpretation value $VE_i$ ($i \in [1;4]$), by which the element is identified (for $E_1$=Blue, $VE_1$=BlUe; for $E_2$=Orange, $VE_2$=OrAnGe; for $E_3$=Airplane, $VE_3$=AiRpLaNeArRoW; for $E_4$=1, $VE_4$=OnEnUmBeR), and each property set is assigned a set identifier, wherein the set identifier of the set to which the element $E_i$ belongs is stored as a property pattern $PE_i$ with the passcode sequence for passcode validation ($PE_1$=Color; $PE_2$=Color; $PE_3$=Image; $PE_4$=Number), for each element $E_i$ from the passcode sequence ($E_1$, $E_2$, $E_3$, $E_4$) a user-defined rule $RE_i$ is received, where each rule $RE_i$ ($i \in [1;4]$) is assigned a systemic interpretation value $VRE_1$ ($i \in [1;4]$), through which the rule is identified (for $RE_1$=Mark the element (FIG. 5A), $VRE_1$=MarkTheElement; for $RE_2$=Follow a logic model (FIG. 5B) with shift 1 field on the right (FIG. 5C), $VRE_2$=RightRelation; for $RE_3$=Follow the direction of the element (FIG. 5D), $VRE_3$=FollowTheElement; for $RE_4$=Follow the direction of the arrow at the bottom of the field in which the element falls (FIG. 5E), $VRE_4$=FollowTheArrow), and at the request of the user, rules $R_u$, not bound to any element, can also be received, e.g. misleading manipulations, where the number (m) and the position (p) of these manipulations are user-defined constants (e.g. m=1 and p=4+1=5), i.e. $R_1$=1 misleading manipulation after the last secret element (FIG. 5E), $VR_1$=1FalseclickAfter.

In another embodiment, the number (m) and the position (p) are variables, dynamically determined and secretly communicated with the user, according to conditions defined by the user (e.g. as shown in FIGS. 12 and 13).

Also, at the request of the user, conditions and a way of submitting instructions $I_c$ can also be received, by which to amend element(s) and/or rule(s) during the authentication session (e.g. $I_1$ with the same colour as the colour of the element, as shown in FIG. 12, $VI_1$=SameColor, $I_2$ with a red colour in an elliptical beige field, as shown in FIG. 13, $VI_2$=RedBeigeEllipse).

2) encrypting the sequence of system interpretation values ($VE_1$, $VE_2$, $VE_3$, $VE_4$) of elements ($E_1$, $E_2$, $E_3$, $E_4$) from the selected passcode (e.g. SHA256 hashing of BlUeOrAnGeAiRpLaNeArRoWOnEnUmBeR);
3) storing the encrypted sequence $H_s$ (6ceee8700221bf8c4a20858489422f7bbbd9768737f03c9e709e8bc874852699) of system interpretation values ($VE_1$, $VE_2$, $VE_3$, $VE_4$) of elements ($E_1$, $E_2$, $E_3$, $E_4$) from the selected passcode and their property pattern ($PE_1$, $PE_2$, $PE_3$, $PE_4$), e.g. (Color, Color, Image, Number), as well as the system interpretation values of the rules ($VRE_1$, $VRE_2$, $VRE_3$, $VRE_4$, $VR_1$), i.e. (MarkTheElement, RightRelation, FollowTheElement, FollowTheArrow, 1FalseclickAfter) in a user database.

If conditions and way of submitting instructions are received ($VI_1$, $VI_2$), i.e. (SameColor, RedBeigeEllipse), they are stored too.

When authenticating with a user passcode:

1) accessing a user information database comprising the encrypted sequence Hs of system interpretation values ($VE_1$, $VE_2$, $VE_3$, $VE_4$) of elements ($E_1$, $E_2$, $E_3$, $E_4$) from the selected passcode and their property pattern ($PE_1$, $PE_2$, $PE_3$, $PE_4$), as well as the system interpretation values of the rules ($VRE_1$, $VRE_2$, $VRE_3$, $VRE_4$, $VR_1$).

If conditions and way of submitting instructions are stored ($VI_1$, $VI_2$), access to them is also provided.

2) generating and manifesting random arrangements of elements into selection fields $F_j$ ($j \in [1;12]$) on a login screen (e.g. as shown in FIG. 7), among which are also the elements ($E_1$, $E_2$, $E_3$, $E_4$) from the selected passcode sequence.

If conditions and a way of submitting instructions are stored, random combinations of instructions (e.g. as shown in FIGS. 12 and 13) are generated and manifested to amend the element(s) of the selected passcode sequence (e.g. as shown in FIG. 12), $I_1$ amends for the given authentication session the first element ($E_1$) from "blue" to "6") and/or amend rule(s) (e.g. as shown in FIG. 13, $I_2$ amends for the given authentication session rule $R_1$ from "1 misleading manipulation after the last secret element" to "3misleading manipulations after the last secret element").

3) receiving a selection of selection fields (e.g. as shown in FIG. 7: first field 0 (because it has a blue background) (FIG. 7A), then field 3 (because it is to the right of the field with an orange background) (FIG. 7B), then field 0 (because the airplane is pointing at it) (FIG. 7C), then field 4 (because the arrow in field 1 is pointing at it) (FIG. 7D) and finally a random field (in this case field 5) (FIG. 7E)) and identifying the elements in them that matter for the authentication (in this case: blue, orange, airplane, 1) by following the instructions and rules and using the property pattern stored in the user database.

In the example depicted in FIG. 12, an instruction in blue to amend the secret element "blue" is manifested. According to this instruction, in the beginning, instead of selecting field 0, where the blue background is, field 6 is selected, as this is the number set by the instruction with the same blue colour.

In the example depicted in FIG. 13, an instruction in red to amend the number of misleading manipulations is manifested. According to this instruction, finally, instead of selecting 1 random field, 3 random fields are selected.

4) encrypting the received sequence of system interpretive values (BlUeOrAnGeAiRpLaNeArRoWOnEnUmBeR) of the identified elements (blue, orange, airplane, 1);

5) comparing the encrypted sequence $H_s$ (6ceee-8700221bf8c4a20858489422f7bbbd9768737f03c9e-709e8bc874852699) with the stored $H_s$ (6ceee-8700221bf8c4a20858489422f7bbbd9768737f03c9e-709e8bc874852699) and granting access as there is a match ($H_x=H_s$).

According to one embodiment, when locking (encoding) an electronic message or file, the method allows the user to verify and essentially lock the information with his personal secret combination, and the user who receives the information to verify and essentially unlock the information submitted to him with the identification choice based on his own secret combination, which is different and unknown to the sender of the information and to all the others.

According to another embodiment, in addition to their own secret combinations, users can also use a shared secret combination (e.g. element "red" with rule "mark the element" and element "6" with rule "mark the element" on FIG. 14).

This reduces the risk of disclosing sensitive information to the wrong recipient. In this case, if a message is accidentally sent to the wrong addressee (recipient), he will not be able to unlock it with an identification choice based only on his personal secret combination as he will not know the "shared secret".

Alternative embodiments are possible in which rules are defined by an algebraic, geometric, associative, or custom logic model.

FIG. 15 depicts an algebraic logic model, in which, for element "orange" is defined a rule for addition of the number of the selection field, which contains the element with the number 4 and marking the selection field(s) with the number(s), reflecting the result of the addition. In the specific example, on the login screen the element "orange" is in selection field with number 9, adding 9 to 4 gives 13, so 2 selection fields are marked—first the selection field with number 1 and then the selection field with number 3.

FIG. 5C depicts a geometric logic model, in which an offset ($\Delta x=+1$) is defined for the element "orange", i.e. a shift one field on the right. In this variant, during authentication, instead of marking the selection field with orange background, the selection field on the right should be marked. In the example of the login screen shown in FIG. 7B, the element "orange" is located in the selection field with number 2, therefore the selection field with number 3 (located on the right) is marked.

FIG. 16 depicts an associative logic model, in which a rule for 4 misleading manipulations is defined for the element "clover" in case the number 4 is in the same selection field, relying on easier memorization due to the association of "Four-leaf clover" and 4 with 4 misleading manipulations.

FIG. 17 depicts a custom logical model, in which, for the element "orange" is defined a rule for following the direction of the "pointer", if both elements fall into the same selection field; for 4 misleading manipulations if element "orange" and element "clover" or element "4" fall into the same selection field, and to mark the selection field in which the element "orange" falls in all other cases. In the first case shown, the element "orange" is in the same selection field with the "pointer" (selection field #), so, instead of marking the selection field in which the secret element is located, the selection field at which the secret element points is marked, i.e. following the direction of the pointer, selection field with number 9 is marked. In the second case shown, the element "orange" is in the same selection field with the element "4", so 4 misleading manipulations are performed. In the third case shown, the element "orange" is not together with the "pointer", nor with the element "clover", nor with the element "4", so the selection field in which the element "orange" falls is marked (selection field with number 1).

FIG. 5E depicts a logic model, in which, for element "1", a rule for following the direction of the arrow is defined. In the example of the login screen shown in FIG. 7D, element "1" is together with an arrow pointing downwards, therefore the selection field with number 4, located below, is marked.

The method also allows a variant embodiment, in which, in case of a forgotten secret combination, it asks the user pre-formulated guiding questions to help him remember the secret combination. This is done in secret for others, e.g. through headphones on which only the user hears the questions. If the user fails to remember the secret combination, he is given the opportunity to enter a new secret combination, which, however, in order to become active, must be confirmed by another user with whom the user had a "shared secret", by entering "shared secret", within a certain period of time after the request for change.

Unlike the methods in which the user sets a static PIN, in the considered authentication method the position and/or the number of manipulations changes, which increases the security many times over.

Upon successful implementation of the method, the system grants user access. In case of failure, an error message is displayed on the screen, the user session is closed, and the user can start a new session in which the elements are mixed again. After a number of unsuccessful attempts, user access may be partially or completely blocked.

In the exemplary embodiments shown in the figures, all the described features (operations) are depicted and/or randomly generated for a given authentication session and have been valid for a certain period of time, after which they are no longer relevant, accordingly, it is impossible to authenticate a user by repeating them.

The invention claimed is:

1. A computer-implemented method for user authentication, comprising: receiving, via a user interface associated with a user account, a passcode sequence comprising k passcode elements ($E_1, E_2, \ldots, E_k$) selected from a library of n elements organized into q property sets, wherein each passcode element $E_i (i \in [1;k])$ is assigned a system interpretation value $VE_i$ and a property pattern $PE_i$ identifying its property set; receiving and storing, for each passcode element $E_i$, a user-defined rule RE; assigned a system interpretation value $VRE_i$, wherein each rule $RE_i$ determines, based on the position of $E_i$ in a current authentication session, a target selection field to be marked; wherein the passcode sequence and the corresponding user-defined rules $RE_i$ together define an authentication credential for the user account, and wherein the identification choice is a session-specific representation of the authentication credential determined from the randomized login screen; receiving, via the user interface, an authentication configuration for the user account comprising: zero or more element-independent rules $R_u$, each assigned a system interpretation value $VR_u$ and each applicable independently of any passcode element position as a session-level constraint on the identification choice; and zero or more instruction triggers $I_c$, each assigned a system interpretation value $VI_c$ and each specifying conditions under which, for the current session only, one or more stored passcode elements $E_i$ are replaced by or treated as alternative elements from the library, or one or more stored rules $RE_i$ or $R_u$ are replaced by or modified into alternative rules, or both; storing, in a user database associated with the user account, a stored authentication value $H_s$ derived exclusively from the system interpretation values ($VE_1$, $VE_2$, . . . , $VE_k$) of the passcode elements, together with the property patterns ($PE_1$, $PE_2$, . . . , $PE_k$) and the system interpretation values of all received rules stored in association with $H_s$, wherein $VRE_i$ and $VR_u$ are used solely to determine the identification choice and do not form part of $H_s$; generating, for each authentication session independently, a randomized login screen comprising a plurality of selection fields $F_i(j \in [1;v])$, each selection field containing a plurality of elements from at least two different property sets, wherein the passcode elements ($E_1$, $E_2$, . . . , $E_k$) are distributed among the selection fields and their positions vary between sessions; evaluating the stored instruction triggers $I_c$ and, when trigger conditions are satisfied, generating and manifesting session-specific amendments on the login screen or via a channel separate from the device on which authentication is performed; receiving, via the user interface, an ordered sequence of user-selected selection fields constituting an identification choice; processing the identification choice using the property patterns $PE_i$, the user-defined rules $RE_i$, any active element-independent rule $R_u$, and any active session-specific amendment, to identify a sequence of passcode elements represented by the identification choice in the current authentication session; generating an authentication value $H_x$ by encrypting the system interpretation values of the identified sequence of passcode elements, comparing $H_x$ with the stored $H_s$; and granting access if $H_x$ matches $H_s$, and denying access otherwise; wherein at least one rule $RE_i$ maps the corresponding passcode element $E_i$ to a target selection field $F_i$ that is different from the selection field containing the corresponding passcode element $E_i$, such that the identification choice, includes at least, one selection field that does not contain the corresponding passcode element $E_i$.

2. The method of claim 1, wherein at least one rule $RE_i$ is a logic-model rule and the logic model determines a logical connection (relation) set on an algebraic, geometric, associative, or custom principle, using operations including at least one of: addition (+), subtraction (−), multiplication (×), division (÷), displacement ($\Delta x$), conjunction ($\wedge$), disjunction ($\vee$), negation ($\neg$), exclusionary disjunction ($\veebar$), implication ($\Rightarrow$), or double implication ($\Leftrightarrow$).

3. The method of claim 1, wherein each selection field $F_i$ contains an element from a property set suitable for configuring a logic model, and at least one rule $RE_i$ is a logic-model rule configured through that element.

4. The method of claim 1, wherein a single common logic model defines a universal rule applied identically to all passcode elements ($E_1$, $E_2$, . . . , $E_k$).

5. The method of claim 1, wherein at least one logic-model rule $RE_i$ changes cyclically, randomly, periodically, on a geographical basis, or upon occurrence of a predefined event, such that the mapping between $E_i$ and its target selection field $F_i$ varies across authentication sessions.

6. The method of claim 1, wherein at least one element-independent rule $R_u$ requires that field selection be performed in a specific way.

7. The method of claim 1, wherein at least one session-specific amendment to a passcode element or rule is manifested covertly by a distinguishing attribute of a passcode element $E_i$ that is perceptible to the user associated with the user account but not identifiable as an amendment instruction by an observer.

8. The method of claim 1, wherein at least one session-specific amendment to a passcode element or rule is manifested by an element co-located with passcode element $E_i$ within the same selection field $F_i$.

9. The method of claim 1, wherein at least one element in the library is movable and changes direction at defined intervals during an authentication session, and wherein a rule $RE_i$ applied to that element requires marking the selection field indicated by the element's current direction at the moment the user associated with the user account makes the selection.

10. The method of claim 1, further comprising encrypting a message or file for a recipient user account with a content encryption key; generating, only upon successful authentication of the recipient user account, a recipient authentication-derived value based on the system interpretation values of the passcode elements identified from the recipient user account's valid identification choice; protecting the content encryption key using the recipient authentication-derived value; and storing or transmitting the encrypted message or file together with the protected content encryption key, wherein decryption of the message or file requires the recipient user account to perform a valid identification choice to regenerate the recipient authentication-derived value and recover the content encryption key.

11. The method of claim 10, wherein protecting the content encryption key further incorporates a shared secret pre-arranged between a sender and the recipient user account, such that recovering the content encryption key requires both successful authentication of the recipient user account and knowledge of the shared secret.

12. The method of claim 1, further comprising a secure passcode reset procedure comprising: presenting encoded mnemonic prompts through a predefined secure communication channel to assist the user associated with the user account in recalling the passcode sequence; and, upon failure to recall, permitting registration of a new passcode sequence, wherein the new passcode sequence does not become active until a guarantor—a predefined second user account that shares a shared secret with the primary user account—confirms the reset by the user associated with the guarantor user account successfully performing an identification choice based on that shared secret within a predetermined time window following the reset request.

13. The method of claim 1, wherein the property sets include at least one of: numbers, letters, special characters, colours, textures, arrows, zodiac and other signs, logos, hieroglyphs, images, photographs, two-dimensional objects, or three-dimensional objects.

14. The method of claim 1, wherein at least one element in the library has a shape that indicates a direction, serving as a pointer-type element, and at least one rule $RE_i$ is a pointer-following rule requiring marking the selection field indicated by the directional shape of $E_i$ or by the direction of a pointer-type element co-located with $E_i$ in the same selection field, as manifested in the current authentication session.

15. The method of claim 1, wherein the user associated with the user account adds one or more personalized elements to the library via the user interface, wherein the personalized elements are stored in the user database exclusively associated with that user account and are not made available to any other user account, such that any authentication session initiated from a different user account cannot generate a login screen containing the personalized elements, thereby requiring possession of the user account credentials in addition to knowledge of the passcode sequence and rules.

16. The method of claim 1, wherein the authentication configuration of the user account, comprising the passcode elements ($E_1$, $E_2$, . . . , $E_k$) and the rules ($RE_1$, $RE_2$, . . . , $RE_k$), is specific to that user account, such that two user accounts selecting identical passcode elements from the library produce different identification choices due to different rules, whereby an adversary who identifies the passcode elements of a target user account cannot determine a valid identification choice without additionally knowing the rules assigned to those elements.

17. The method of claim 1, wherein at least one element-independent rule $R_u$ requires a number m of misleading manipulations field selections that do not correspond to any passcode element or applied rule $RE_i$—wherein m is indicated to the user associated with the user account by an indicator (element co-located) with a passcode element $E_i$ in the same selection field $F_i$, the indicator element serving as an implicit numeric sign conveying m without identifying any passcode element to an observer.

18. The method of claim 17, wherein the position p within the identification choice sequence at which the m misleading manipulations are to be performed is indicated by second indicator element co-located with passcode element $E_i$ in the same selection field $F_i$, the second indicator element serving as an implicit positional sign readable only by the user associated with the user account who knows the stored authentication configuration.

19. The method of claim 3, wherein for the property set of arrows at least one rule $RE_i$ requires following the direction of the arrow co-located with passcode element $E_i$ in the same selection field $F_i$.

20. The method of claim 6, wherein the field selection is performed by at least one of: swiping across the field, touching only a partial area of the field, touching only a side of the field, or pressing and holding the field for a predetermined duration.

* * * * *